United States Patent
Misra et al.

(10) Patent No.: US 10,824,870 B2
(45) Date of Patent: Nov. 3, 2020

(54) NATURAL LANGUAGE EMINENCE BASED ROBOTIC AGENT CONTROL

(71) Applicant: ACCENTURE GLOBAL SOLUTIONS LIMITED, Dublin (IE)

(72) Inventors: Janardan Misra, Bangalore (IN); Sanjay Podder, Thane (IN); Divya Rawat, Dehradun (IN); Bhaskar Ghosh, Bangalore (IN); Neville Dubash, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 301 days.

(21) Appl. No.: 16/020,611

(22) Filed: Jun. 27, 2018

(65) Prior Publication Data

US 2019/0005329 A1  Jan. 3, 2019

(30) Foreign Application Priority Data

Jun. 29, 2017  (IN) .............................. 201741022771

(51) Int. Cl.
*G06K 9/00* (2006.01)
*G06N 3/00* (2006.01)
(Continued)

(52) U.S. Cl.
CPC ....... *G06K 9/00684* (2013.01); *G06F 16/367* (2019.01); *G06F 16/90332* (2019.01); *G06F 40/216* (2020.01); *G06F 40/30* (2020.01); *G06F 40/56* (2020.01); *G06K 9/00671* (2013.01); *G06K 9/726* (2013.01); *G06N 3/006* (2013.01); *G06N 3/008* (2013.01); *G06N 5/022* (2013.01); *B25J 9/1697* (2013.01); *G06K 9/00664* (2013.01); *G06N 5/048* (2013.01); *G06N 20/00* (2019.01)

(58) Field of Classification Search
None
See application file for complete search history.

(56) References Cited

U.S. PATENT DOCUMENTS

| 5,899,956 A * | 5/1999 | Chan ...................... G01C 21/28 340/988 |
| 6,542,788 B2 * | 4/2003 | Hosonuma ............. B25J 9/1674 318/568.12 |

(Continued)

OTHER PUBLICATIONS

An overview of empirical natural language processing, Eric Brill et al., AI magazine, Pro Quest, Winter 1997, pp. 13-24 (Year: 1997).*

(Continued)

*Primary Examiner* — Jayesh A Patel
(74) *Attorney, Agent, or Firm* — Mannava & Kang, P.C.

(57) ABSTRACT

In some examples, natural language eminence based robotic agent control may include ascertaining, by a robotic agent, an image of an object or an environment, and ascertaining a plurality of natural language insights for the image. For each insight of the plurality of insights, an eminence score may be generated, and each insight of the plurality of insights may be ranked according to the eminence scores. An operation associated with the robotic agent, the object, or the environment may be controlled by the robotic agent and based on a highest ranked insight.

20 Claims, 20 Drawing Sheets

(51) Int. Cl.
*G06F 16/36* (2019.01)
*G06F 16/9032* (2019.01)
*G06K 9/72* (2006.01)
*G06N 5/02* (2006.01)
*G06F 40/30* (2020.01)
*G06F 40/56* (2020.01)
*G06F 40/216* (2020.01)
*B25J 9/16* (2006.01)
*G06N 5/04* (2006.01)
*G06N 20/00* (2019.01)

(56) References Cited

U.S. PATENT DOCUMENTS

| | | | |
|---|---|---|---|
| 8,180,760 B1 | 5/2012 | Carver | |
| 8,200,204 B2* | 6/2012 | Cho | G01C 21/26 455/414.2 |
| 9,037,296 B2* | 5/2015 | Choe | G05D 1/0022 700/259 |
| 2001/0021882 A1* | 9/2001 | Hosonuma | G06N 3/008 700/245 |
| 2004/0071347 A1* | 4/2004 | Kaplan | G06T 7/215 382/217 |
| 2004/0093328 A1 | 5/2004 | Damle | |
| 2006/0143017 A1* | 6/2006 | Sonoura | G10L 15/26 704/275 |
| 2006/0222238 A1* | 10/2006 | Nishiyama | G06T 7/285 382/154 |
| 2007/0047809 A1* | 3/2007 | Sasaki | G06K 9/00791 382/170 |
| 2007/0192910 A1* | 8/2007 | Vu | G05D 1/0274 700/245 |
| 2008/0119959 A1* | 5/2008 | Park | G06N 3/008 700/245 |
| 2009/0232387 A1* | 9/2009 | Gulati | G06K 9/3241 382/154 |
| 2010/0329504 A1* | 12/2010 | Chen | G06K 9/4671 382/100 |
| 2011/0122247 A1* | 5/2011 | Kim | G08B 13/19682 348/143 |
| 2012/0195499 A1* | 8/2012 | Hosomi | G06F 16/58 382/162 |
| 2012/0242473 A1* | 9/2012 | Choi | G01C 21/3688 340/441 |
| 2014/0157299 A1* | 6/2014 | Alcala | H04N 21/251 725/14 |
| 2014/0280952 A1 | 9/2014 | Shear | |
| 2015/0356414 A1* | 12/2015 | Sanchez | G06F 16/2465 706/50 |
| 2016/0284217 A1* | 9/2016 | Lee | B60K 35/00 |
| 2016/0378861 A1 | 12/2016 | Eledath | |
| 2017/0040019 A1 | 2/2017 | Ichimura | |
| 2017/0089714 A1* | 3/2017 | Liu | G01C 21/3647 |
| 2017/0116187 A1* | 4/2017 | Erickson | G06F 40/253 |
| 2017/0125008 A1* | 5/2017 | Maisonnier | B25J 11/0005 |
| 2017/0361468 A1* | 12/2017 | Cheuvront | G06F 3/01 |
| 2018/0012590 A1* | 1/2018 | Heo | G06F 40/30 |
| 2018/0285386 A1* | 10/2018 | Liu | G06F 16/5838 |
| 2019/0158443 A1* | 5/2019 | Liao | H04L 67/306 |

OTHER PUBLICATIONS

Towards a construction-based—Simulation, Peter Ford Dominey, ELSEVIER, 0925-2312, 2006, pp. 2288-2302 (Year: 2006).*
Robot navigation based—Graphs, Christian Mandel et al., IEEE, 1-4244-0259, 2006, pp. 205-210 (Year: 2006).*

* cited by examiner

Example Scenario

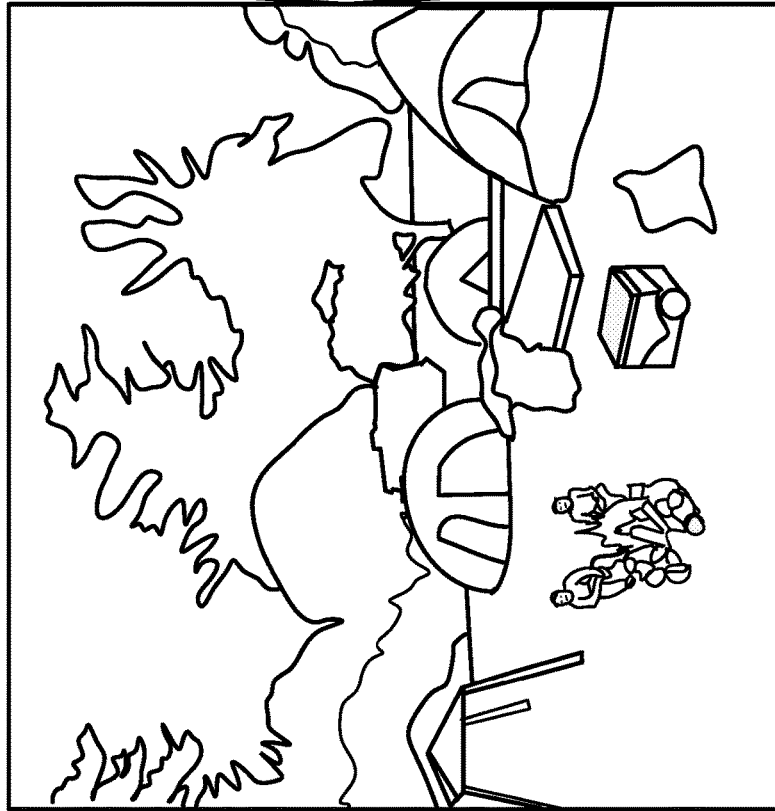

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, Mountains nearby and group of people sitting around their tents. |
| Insight 7 | A group of people camping and relaxing in the vicinity of nature. |
| Insight 8 | Some camping going on and food, chairs, tables and tents are around |
| Insight 9 | Picnic or outing involving camping. The ground is Surrounded by a variety of green trees. There must Be 20 people in the picnic |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

FIG. 4

From Multiple Insights to Multi-Level Insights

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, Mountains nearby and group of people sitting around their tents. |
| Insight 7 | A group of people camping and relaxing in the vicinity of nature |
| Insight 8 | Some camping going on and food, chairs, tables and tents are around |
| Insight 9 | Picnic or outing involving camping. The ground is Surrounded by a variety of green trees. There Must be 20 people in the picnic |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

How natural insight are?
How reliable insight are?
How concise insight are?
How atypical insights are?
How to-the-point insight are?
Which are potentially inconsistent or erroneous insights?
Which insights are semantically similar or duplicates or redundant?
What are the central concepts embedded in these insights?
How are these insights semantically related with one another?

FIG. 5

(*) How concise i.e., comprehensive yet brief insights are?

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, mountains nearby and group of people sitting around their tents. |
| Insight 7 | A group of people camping and relaxing in the vicinity of nature. |
| Insight 8 | Some camping going on and food, chairs, tables and tents are around |
| Insight 9 | Picnic or outing involving camping. The ground is surrounded by a variety of green trees. There must be 20 people in the picnic |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

Least concise!

Estimate conciseness score for each insight

Most concise

FIG. 8

(*) To what extent insights are to-the-point?

Most

Estimate intrinsic and relative succinctness of entities and in turn for insights

Least

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, mountains nearby and group of people sitting around their tents. |
| Insight 7 | A group of people camping and relaxing in the vicinity of nature. |
| Insight 8 | Some camping going on and food, chairs, tables and tents are around |
| Insight 9 | Picnic or outing involving camping. The ground is surrounded by a variety of green trees. There must be 20 people in the picnic |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

FIG. 9

(*) How natural insights are?

| SN | Insight |
|---|---|
| Insight 3 | Picnic tables and chairs with tents on a campsite |
| Insight 11 | It's an awesome place for outing, rejuvenating and having fun. The view is awesome and full of greenery. Perfect place for family and friends get together. |
| Insight 10 | It's a beautiful place for an outing nice mountain view so many trees good place to chill out with family and friends |
| Insight 9 | Picnic or outing involving camping. The ground is surrounded by a variety of green trees. There must be 20 people in the picnic |
| Insight 4 | Some trees near to a group of people camping in tents |
| Insight 5 | A group of people camping together |
| Insight 8 | Some camping going on and food, chairs, tables and tents are around |
| Insight 6 | A scenic picnic spot with lots of trees around, mountains nearby and group of people sitting around their tents. |
| Insight 7 | A group of people camping and relaxing in the vicinity of nature. |
| Insight 2 | Among trees and bushes there is a camping site |
| Insight 1 | A campground with a woman |

Are there any potentially inconsistent or erroneous insights?

Most natural (consistent) insight

For each insight:
1. Transform insight into intrinsic semantic relatedness graph and estimate intrinsic semantic consistency (ISC) Score
2. Estimate likelihood of all part-of-speech (POS) trigrams within insight. Mean likelihood score across all trigrams is POS_Score for the insight
3. Estimate Naturalness_Score (NS) as an average of ISC_Score and POS_Score
4. Rank insights based upon Naturalness_Score Least natural (Potentially inconsistent or erroneous insight)

FIG. 10

How are insights semantically related with one another?

| | |
|---|---|
| Insight 1 | A campground with a woman |
| Insight 2 | Among trees and bushes there is a camping site |
| Insight 3 | Picnic tables and chairs with tents on a campsite |
| Insight 4 | Some trees near to a group of people camping in tents |
| Insight 5 | A group of people camping together |
| Insight 6 | A scenic picnic spot with lots of trees around, mountains nearby and group of people sitting around their tents. |
| Insight 7 | A group of people camping and relaxing in the vicinity of nature. |
| Insight 8 | Some camping going on and food, chairs, tables and tents are around |
| Insight 9 | Picnic or outing involving camping. The ground is surrounded by a variety of green trees. There must be 20 people in the picnic. |
| Insight 10 | It's a beautiful place for an outing nice mountain view so many trees good place to chill out with family and friends |
| Insight 11 | It's an awesome place for outing, rejuvenating and having fun. The view is awesome and full of greenery. Perfect place for family and friends get together. |

- Form <u>semantic relatedness graph among</u> insights

ASCERTAIN, BY A ROBOTIC AGENT, AN IMAGE OF AN OBJECT OR AN ENVIRONMENT
1902

ASCERTAIN, BY AT LEAST ONE HARDWARE PROCESSOR, A PLURALITY OF NATURAL LANGUAGE INSIGHTS FOR THE IMAGE
1904

GENERATE, BY THE AT LEAST ONE HARDWARE PROCESSOR, FOR EACH INSIGHT OF THE PLURALITY OF INSIGHTS, AN EMINENCE SCORE BY DETERMINING, FOR THE EMINENCE SCORE, AT LEAST ONE OF A RELIABILITY SCORE, A DEGREE OF ATYPICALNESS, A CONCISENESS SCORE, A SUCCINCTNESS SCORE, OR A NATURALNESS SCORE, DETERMINING WHETHER THE EMINENCE SCORE EXCEEDS A SPECIFIED EMINENCE SCORE THRESHOLD, AND BASED ON A DETERMINATION THAT THE EMINENCE SCORE EXCEEDS THE SPECIFIED EMINENCE FOR THRESHOLD, UTILIZING AN INSIGHT ASSOCIATED WITH THE EMINENCE SCORE THAT EXCEEDS THE SPECIFIED EMINENCE SCORE THRESHOLD FOR SELECTION OF A HIGHEST RANKED INSIGHT
1906

RANK, BY THE AT LEAST ONE HARDWARE PROCESSOR, EACH INSIGHT OF THE PLURALITY OF INSIGHTS ACCORDING TO THE EMINENCE SCORES
1908

CONTROL, BY THE AT LEAST ONE HARDWARE PROCESSOR, BY THE ROBOTIC AGENT AND BASED ON THE HIGHEST RANKED INSIGHT, AN OPERATION ASSOCIATED WITH THE ROBOTIC AGENT, THE OBJECT, OR THE ENVIRONMENT
1910

FIG. 19

NATURAL LANGUAGE EMINENCE BASED ROBOTIC AGENT CONTROL

PRIORITY

This application is a Non-Provisional application of commonly assigned and co-pending India Provisional Application Serial Number 201741022771, filed Jun. 29, 2017, and claims priority to commonly assigned and concurrently filed U.S. patent application titled "Natural Language Unification based Robotic Agent Control", the disclosures of which are hereby incorporated by reference in their entireties.

BACKGROUND

A variety of techniques may be used to control a robotic system. For example, the robotic system may be pre-programmed with a set of instructions to perform a specified task, and/or to control a secondary device. Alternatively, the robotic system may obtain an image of an object or environment using a camera or another viewing device, and determine and/or receive, based on the image, a set of instructions.

BRIEF DESCRIPTION OF DRAWINGS

Features of the present disclosure are illustrated by way of example and not limited in the following figure(s), in which like numerals indicate like elements, in which:

FIG. 4 illustrates another image and possible insights to illustrate operation of the natural language eminence based robotic agent control apparatus of FIG. 1 in accordance with an example of the present disclosure;

FIG. 5 illustrates the aspect of multiple insights to multi-level insights to illustrate operation of the natural language eminence based robotic agent control apparatus of FIG. 1 in accordance with an example of the present disclosure;

FIG. 8 illustrates determination of the most concise insight by determination of a conciseness score to illustrate operation of the natural language eminence based robotic agent control apparatus of FIG. 1 in accordance with an example of the present disclosure;

FIG. 9 illustrates determination of an extent to which insights are to-the-point by determination of intrinsic and relative succinctness to illustrate operation of the natural language eminence based robotic agent control apparatus of FIG. 1 in accordance with an example of the present disclosure;

FIG. 10 illustrates determination of how natural insights are (e.g., determination of potentially inconsistent or erroneous insights) by transformation of each insight into a semantic graph and estimation of a naturalness score to illustrate operation of the natural language eminence based robotic agent control apparatus of FIG. 1 in accordance with an example of the present disclosure;

FIG. 15 illustrates determination of semantic relatedness between insights to illustrate operation of the natural language eminence based robotic agent control apparatus of FIG. 1 in accordance with an example of the present disclosure;

FIG. 19 illustrates a flowchart of an example method for natural language eminence based robotic agent control in accordance with an example of the present disclosure.

DETAILED DESCRIPTION

Figure 1:
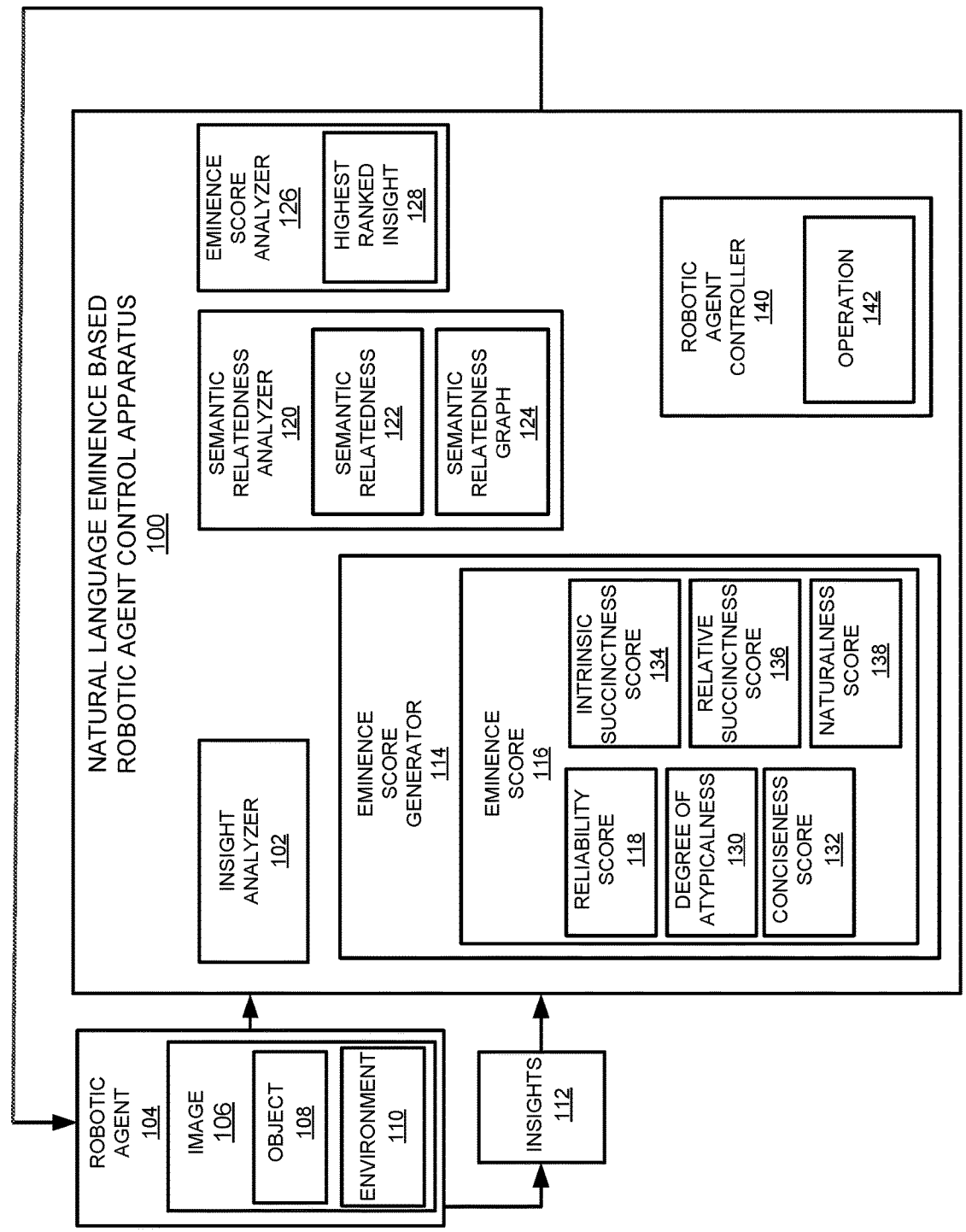
FIG. 1 illustrates a layout of a natural language eminence based robotic agent control apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Natural language eminence based robotic agent control apparatuses, methods for natural language eminence based robotic agent control, and non-transitory computer readable media having stored thereon machine readable instructions to provide natural language eminence based robotic agent control are disclosed herein. The apparatuses, methods, and non-transitory computer readable media disclosed herein provide for natural language eminence based robotic agent control by ascertaining, by a robotic agent, an image of an object or an environment, and ascertaining a plurality of natural language insights for the image. A robotic agent may include a hardware and software device that may not be explicitly programmed to make decisions in uncertain environments (thus, it may be unknown what decisions a robotic agent may take in a new environment). For each insight of the plurality of insights, an eminence score may be generated, and each insight of the plurality of insights may be ranked according to the eminence scores. An operation associated with the robotic agent, the object, or the environment may be controlled by the robotic agent and based on a highest ranked insight. Thus, as disclosed herein, an eminence score may be used to rank insights to make selections, for an absolute eminence score based analysis to perform computations on the eminence scores to make decisions (e.g., accept only those insights having a naturalness score >0.3), and/or a variability analysis on a set of eminence scores to perform inferences (e.g., complexity of the underlying object of observation).

With respect to natural language eminence, the apparatuses, methods, and non-transitory computer readable media disclosed herein provide for analysis of natural language text data (e.g., in the form of descriptions), for example, for images for visually impaired users, robotics, etc. In this regard, the natural language text data may be referred to as insights as disclosed herein.

With respect to control of a robotic system that may include a robotic agent such as a machine, a vehicle, or another such device, in order to perform a specified task, and/or to control a secondary device, a variety of techniques may be used. For example, the robotic agent may obtain an image of an object or environment using a camera or another viewing device, and determine and/or receive, based on the image, a set of instructions. The instructions may be presented in the form of insights with respect to the image. Alternatively, even if the instructions are not related to an image, a plurality of instructions may be presented in the form of insights to control the robotic agent, and/or to utilize the robotic agent to control a further device. With respect to an image, the image may be analyzed to identify objects within the image. An image may also be analyzed to determine and/or ascertain insights with respect to the image and the identified objects. When a plurality of insights are presented to the robotic agent with or without respect to an image, it is technically challenging for the robotic agent to eliminate uncertainties with respect to the plurality of insights, and to make a decision with respect to the plurality of insights, and/or with respect to the object or the environment being viewed by the robotic agent. The decision as disclosed herein may include performing a specified task such as manipulation of an object in the image, controlling a secondary device to perform a further task, and generally performing any type of operation that may be performed by a robotic agent.

In the field of visually impaired users, when such a user views an image, it is similarly technically challenging to eliminate uncertainties with respect to a plurality of insights related to the image, and to present the user with an insight that correctly represents content of the image.

In order to address at least the aforementioned technical challenges related, for example, to a plurality of insights that may be related to an image of an object or an environment being viewed by the robotic agent, a plurality of insights that may be related to a plurality of instructions received by a robotic agent, a plurality of insights that may be related to an image that is to be viewed or being viewed by visually impaired user, and other types of insights generally, the apparatuses, methods, and non-transitory computer readable media disclosed herein may analyze an ensemble of multiple services to rank a multitude of outputs from different services. The apparatuses, methods, and non-transitory computer readable media disclosed herein may generate rankings of a plurality of insights for an end user and/or a robotic system from multiple heterogeneous insights that may be received and/or generated by different artificial intelligence services. In this regard, the apparatuses, methods, and non-transitory computer readable media disclosed herein may present a ranking of a plurality of input insights to a user, such as a visually impaired user, by selecting the best description. Similarly, the apparatuses, methods, and non-transitory computer readable media disclosed herein may present a ranking of a plurality of input insights (e.g., instructions) to control a robotic system and/or to be utilized by the robotic system to control a secondary device.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example natural language eminence based robotic agent control apparatus (hereinafter also referred to as "apparatus 100").

Referring to FIG. 1, the apparatus 100 may include an insight analyzer 102 that is executed by at least one hardware processor (e.g., the hardware processor 1802 of FIG. 18, and/or the hardware processor 2004 of FIG. 20) to ascertain, by a robotic agent 104, an image 106 of an object 108 or an environment 110, and ascertain a plurality of natural language insights 112 for the image 106.

An eminence score generator 114 that is executed by the at least one hardware processor (e.g., the hardware processor 1802 of FIG. 18, and/or the hardware processor 2004 of FIG. 20) may generate, for each insight of the plurality of insights 112, an eminence score 116, and rank each insight of the plurality of insights 112 according to the eminence scores.

According to examples disclosed herein, the eminence score generator 114 may generate, for each insight of the plurality of insights 112, the eminence score 116 by determining, for the eminence score 116, a reliability score 118 by determining, by a semantic relatedness analyzer 120 that is executed by the at least one hardware processor (e.g., the hardware processor 1802 of FIG. 18, and/or the hardware processor 2004 of FIG. 20), semantic relatedness 122 between each insight of the plurality of insights 112. Semantic relatedness may indicate, for example, that two elements are related to each other, and semantic similarity may represent a specific type of semantic relatedness, which may indicate that the elements are equivalent as far as their usage is concerned. The semantic relatedness analyzer 120 may generate, based on the semantic relatedness 122 between each insight of the plurality of insights 112, a semantic relatedness graph 124, where each node of the semantic relatedness graph 124 may represent an insight of the plurality of insights 112. The eminence score generator 114 may determine, for each node of the semantic relatedness graph 124, a degree of centrality that represents the reliability score for the corresponding insight.

An eminence score analyzer 126 that is executed by the at least one hardware processor (e.g., the hardware processor 1802 of FIG. 18, and/or the hardware processor 2004 of FIG. 20) may analyze reliability scores for the plurality of insights 112 to identify at least one reliability score that exceeds a reliability score threshold. Further, the eminence score analyzer 126 may identify, for determination of a highest ranked insight 128, at least one insight associated with the identified at least one reliability score that exceeds the reliability score threshold.

According to examples disclosed herein, the eminence score generator 114 may generate, for each insight of the plurality of insights 112, the eminence score 116 by determining, for the eminence score 116, a degree of atypicalness 130 by determining, for each insight of the plurality of insights 112, by the semantic relatedness analyzer semantic relatedness between each pair of words of the insight, and determining, for each insight of the plurality of insights 112, the degree of atypicalness 130 as a function of the semantic relatedness between each pair of words of the insight.

According to examples disclosed herein, the eminence score analyzer 126 may analyze degrees of atypicalness for the plurality of insights 112 to identify at least one degree of atypicalness that exceeds a degree of atypicalness threshold, and identify, for determination of the highest ranked insight, at least one insight associated with the identified at least one degree of atypicalness that exceeds the degree of atypicalness threshold.

According to examples disclosed herein, the eminence score generator 114 may generate, for each insight of the plurality of insights 112, the eminence score 116 by determining, for the eminence score 116, a conciseness score 132 by generating a concept graph that includes nodes that represent concepts extracted from the plurality of insights 112, and edge weights that represent semantic relatedness between the concepts. The eminence score generator 114 may retain, for the concept graph, edges that include an edge weight that exceeds a specified edge weight threshold, generating groups based on remaining concepts that are connected by edges, and determining, for a specified insight, the conciseness score 132 as a function of a total number of concepts occurring in the specified insight and a total number of the groups that are spanned by the concepts occurring in the specified insight.

According to examples disclosed herein, the eminence score analyzer 126 may analyze conciseness scores for the plurality of insights 112 to identify at least one conciseness score that exceeds a conciseness score threshold, and identify, for determination of the highest ranked insight, at least one insight associated with the identified at least one conciseness score that exceeds the conciseness score threshold.

According to examples disclosed herein, the eminence score generator 114 may generate, for each insight of the plurality of insights 112, the eminence score 116 by determining, for the eminence score 116, an intrinsic succinctness score 134 by determining, for each insight of the plurality of insights 112, noun type words. The eminence score generator 114 may generate, for each insight of the plurality of insights 112, a dependency tree, determine, for each dependency tree, a number of dependent nodes associated with the noun type words, and determine, for each insight of the plurality of insights 112, the intrinsic succinctness score 134 as a function of a number of the noun type words and the number of dependent nodes for the associated insight.

According to examples disclosed herein, the eminence score generator 114 may generate, for each insight of the plurality of insights 112, the eminence score 116 by determining, for the eminence score 116, a relative succinctness score 136 by determining, for each insight of the plurality of insights 112, a hierarchy of concepts included in the insight, and determining a number of concepts included in a first insight of the plurality of insight that are at a higher level than concepts included in a second insight of the plurality of insights 112.

According to examples disclosed herein, the eminence score analyzer 126 may analyze relative succinctness scores for the plurality of insights 112 to identify at least one relative succinctness score that exceeds a relative succinctness score threshold, and identify, for determination of the highest ranked insight, at least one insight associated with the identified at least one relative succinctness score that exceeds the relative succinctness score threshold.

According to examples disclosed herein, the eminence score generator 114 may generate, for each insight of the plurality of insights 112, the eminence score 116 by determining, for the eminence score 116, a naturalness score 138 by determining, for each insight of the plurality of insights 112, a semantic relatedness between each pair of words in the insight, and determining, for each insight of the plurality of insights 112, an expected semantic relatedness between node pairs in a semantic relatedness graph as an average of semantic relatedness scores across pairs of nodes in the semantic relatedness graph.

According to examples disclosed herein, the eminence score analyzer 126 may analyze naturalness scores for the plurality of insights 112 to identify at least one naturalness score that is less than a naturalness score threshold, and identify, for determination of the highest ranked insight, at least one remaining insight that is not associated with the identified at least one naturalness score that is less than the naturalness score threshold.

According to examples disclosed herein, the eminence score analyzer 126 may analyze, for each insight of the plurality of insights, a variability associated with the eminence score 116, and determine, based on the variability associated with the eminence score, a degree of complexity of the image 106.

According to examples disclosed herein, the eminence score generator 114 may generate, for each insight of the plurality of insights 112, the eminence score 116 by determining, for the eminence score 116, the reliability score 118, the degree of atypicalness 130, the conciseness score 132, the succinctness score (e.g., intrinsic succinctness score 134 or relative succinctness score 136), and/or the naturalness score 138, and determining whether the eminence score 116 exceeds a specified eminence score threshold. Based on a determination that the eminence score 116 exceeds the specified eminence for threshold, the eminence score generator 114 may utilize an insight associated with the eminence score that exceeds the specified eminence score threshold for selection of the highest ranked insight.

A robotic agent controller 140 that is executed by the at least one hardware processor (e.g., the hardware processor 1802 of FIG. 18, and/or the hardware processor 2004 of FIG. 20) may control, by the robotic agent 104 and based on a highest ranked insight, an operation 142 associated with the robotic agent 104, the object 108, or the environment 110.

Figure 2:
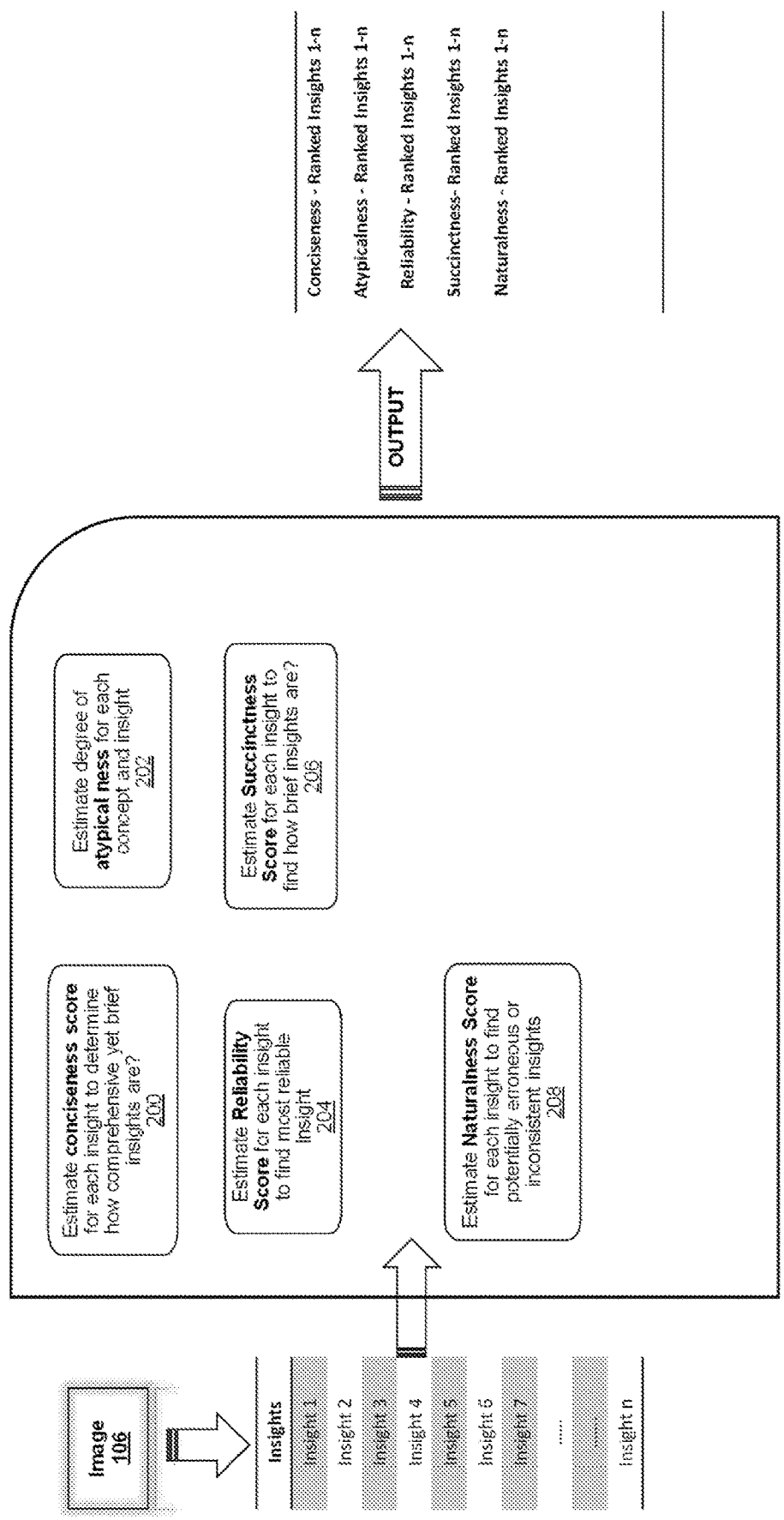
FIG. 2 illustrates a high-level process flow with respect to the natural language eminence based robotic agent control apparatus of FIG. 1 in accordance with an example of the present disclosure.

FIG. 2 illustrates a high-level process flow with respect to the apparatus 100 in accordance with an example of the present disclosure.

Inputs

Referring to FIG. 2, the image 106 and a plurality of the insights 112 may be received. In this regard, inputs to the apparatus 100 may include a set of insights (i.e., textual descriptions) about the image 106, the object 108, and/or the environment 110. An insight may include one or more sentences, and/or a list of words or phrases. Examples of insights may include captions for images or videos, item reviews or feedbacks, social media comments on same event/news, and other such information. With respect to notations, the insights 112 may be represented by Δ. In this regard, |Δ| may denote a number of insights in Δ. Further, syntactic duplicates among insights may be removed before further processing, for example, by using approximate (or fuzzy) string matching techniques.

With respect to the reliability score 118, the degree of atypicalness 130, and the conciseness score 132, the insights 112 may include at least two insights as inputs. However, with respect to the naturalness score 138, and the succinctness score, the insights 112 may include at least one insight as input.

Outputs

Outputs of the apparatus 100 may include the eminence score 116. Further, an output of the apparatus 100 may include a control signal to control the operation 142 associated with the robotic agent 104.

At block 200, the eminence score generator 114 may determine the conciseness score 132 for each insight of the plurality of insights 112, and identify, as results, an insight of the plurality of insights 112 with a maximum conciseness score. In this regard, the eminence score generator 114 may determine how comprehensive yet brief insights are.

At block 202, the eminence score generator 114 may determine the degree of atypicalness 130 for each insight of the plurality of insights 112, and identify, as results, an insight of the plurality of insights 112 with a maximum degree of atypicalness. In this regard, the eminence score generator 114 may determine the degree of atypicalness 130 for each concept and insight.

At block 204, the eminence score generator 114 may determine the reliability score 118 for each insight of the plurality of insights 112, and identify, as results, an insight of the plurality of insights 112 with a maximum reliability score. In this regard, the eminence score generator 114 may identify the most reliable insight.

At block 206, the eminence score generator 114 may determine the succinctness score (e.g., the intrinsic succinctness score 134 or the relative succinctness score 136) for each insight of the plurality of insights 112, and identify, as results, an insight of the plurality of insights 112 with a maximum succinctness score. In this regard, the eminence score generator 114 may determine how brief insights are.

At block 208, the eminence score generator 114 may determine the naturalness score 138 for each insight of the plurality of insights 112, and identify, as results, an insight of the plurality of insights 112 with a maximum naturalness score. In this regard, the eminence score generator 114 may determine potentially erroneous or inconsistent insights that include low naturalness scores.

Input Processing

With respect to determination of semantic relatedness by the semantic relatedness analyzer 120, the semantic relatedness analyzer 120 may perform tokenization and stop word removal for the insights 112. In this regard, the semantic relatedness analyzer 120 may extract tokens (e.g., words) from the insights. The semantic relatedness analyzer 120 may perform stop word removal, where stop words may include those words which are to be ignored during analysis. In this regard, a dynamically configurable list of stop words may be generated, or a predefined list of stop words for the language of insights may be used.

The semantic relatedness analyzer 120 may perform term normalization by replacing all equivalent terms with one representative term. For example, term normalization may include language thesaurus based synonym identification and unification (e.g., WORDNET based 'goal' and 'objective'), lemmatization using, for example, language lexicon and morphological analysis (e.g., 'movement' and 'moving' including the same lemma as 'move'), and short-form and long-form unification (e.g., 'IP' and 'Intellectual Property'). With respect to lemmatization, stemming may be utilized prior to lemmatization (e.g., 'trees' being stemmed to 'tree').

The semantic relatedness analyzer 120 may perform concept extraction by identifying potential 'entity-terms' as 'noun-phrases' and 'functionalities' as 'verb-phrases' by applying, for example, POS-TAGGER™ and CHUNKER™. For example, in the sentence "Some trees near to a group of people camping in tents", the identifiable entity terms may include "group of people", "tents", and "some trees", and the identifiable functionality may include "camping". The semantic relatedness analyzer 120 may utilize phrase mining to extract useful phrases from insights.

Semantic Relatedness

Referring to FIGS. 1 and 2, with respect to semantic relatedness among concepts and insights, the semantic relatedness analyzer 120 may determine vector space representations for words, phrases, and sentences. In this regard, the semantic relatedness analyzer 120 may use word embeddings trained on external text corpuses. For example, an external text corpus may include GLOVE, which may include global vectors for word representation, and may be trained, for example, on WIKIPEDIA, TWITTER, GIGAWORD, etc. Another example of an external text corpus may include WORD2VEC, which includes neural embeddings for word representations, and may be trained, for example, on GOOGLE news corpus.

With respect to semantic relatedness among concepts and insights, the semantic relatedness analyzer 120 may further perform term relevance scoring. The term relevance scoring may represent a term weighing scheme that measures relative relevance of a term with respect to all other terms appearing in the insights 112. Examples of term weighing schemes may include term frequency-inverse document frequency (Tf-Idf), etc. The term weighing schemes may estimate information theoretic weighing for each word with respect to available corpus of insights. In order to perform term relevance scoring, rel(w) may be specified as the weight for word/phrase w, and rel(w) may be specified as:

$$rel(w) = \frac{a}{a + p(w)} \qquad \text{Equation (1)}$$

For Equation (1), a may represent an empirical constant (e.g., $10^{-3}$), and p(w) may represent the probability of occurrence of w. Word embedding for each word may be updated as follows:

$$v(w) \leftarrow rel(w) * v(w) \quad \text{Equation (2)}$$

With respect to semantic relatedness among concepts and insights, the semantic relatedness analyzer 120 may further analyze embeddings for concepts and insights. In this regard, for each multi-word term $z = w_1 \ldots w_n$, the semantic relatedness analyzer 120 may generate term embedding as an average of embeddings of the constituent words as follows:

$$v(z) = mean(v(w_1), \ldots, v(w_n)) = \frac{\sum_{i=1}^{i=n} v(w_i)}{n} \quad \text{Equation (3)}$$

For each insight $f_i \in \Delta$, the semantic relatedness analyzer 120 may populate a list of words in $f_i$ as words($f_i$), and determine the embedding for $f_i$ as a mean vector of its constituent words as follows:

$$v(f_i) = mean(words(f_i)) = \frac{\sum_{z \in words(f_i)} v(z)}{|words(f_i)|} \quad \text{Equation (4)}$$

For Equation (4), $|words(f_i)|$ may represent a number of words in $f_i$. With respect to Equation (3) and Equation (4), instead of mean(.), other functions such as min, max, etc., may be used.

With respect to semantic relatedness among concepts and insights, the semantic relatedness analyzer 120 may further perform semantic relatedness estimation for words. In this regard, the semantic relatedness analyzer 120 may specify $v(w_1)$ and $v(w_2)$ to be the embeddings for words $w_1$ and $w_2$, and specify vector space relatedness using these embeddings to be:

$$Rel_{vec}(w_1, w_2) = Cosine(v(w_1), v(w_2)) \quad \text{Equation (5)}$$

The semantic relatedness analyzer 120 may specify SemRel$_{WordNet}(w_1, w_2)$ be the semantic relatedness estimation based, for example, upon an ontology, such as WORDNET. The semantic relatedness analyzer 120 may apply, for example, Lin measure, which provides normalized scores (i.e., in the range [0,1]), to estimate SemRel$_{WordNet}(w_1, w_2)$. Thus, the semantic relatedness score between $w_1$ and $w_2$ may be specified as follows:

$$SemRel(w_1, w_2) = \max\{Rel_{vec}(w_1, w_2), SemRel_{WordNet}(w_1, w_2)\} \quad \text{Equation (6)}$$

With respect to semantic relatedness among concepts and insights, the semantic relatedness analyzer 120 may further perform semantic relatedness estimation for multi-word text elements. In this regard, the semantic relatedness analyzer 120 may specify $X_1$ and $X_2$ to be multi-word text elements, phrases (e.g., concepts), and insights. The semantic relatedness analyzer 120 may specify Words($X_1$)=$w_{11}, \ldots w_{1N}$ and Words($X_2$)=$w_{21}, \ldots w_{2M}$ to be the lists of words in $X_1$ and $X_2$. For each pair of words $(w_{1x}, w_{2y}) \in X_1 \times X_2$, the semantic relatedness analyzer 120 may estimate the semantic relatedness score as described above. The semantic relatedness score between $X_1$ and $X_2$ may be defined as follows:

$$SemRel(X_1, X_2) = \frac{1}{M+N}\left(\sum_{w_{1x}} \max_{w_{2y}}(SemRel(w_{1x}, w_{2y})) + \sum_{w_{2y}} \max_{w_{1x}}(SemRel(w_{2y}, w_{1x}))\right) \quad \text{Equation (7)}$$

For Equation (7), M and N may be described as the number of words occurring in $X_1$ and $X_2$, respectively.

In some examples, the semantic relatedness analyzer 120 may perform joining of all the tokens in "entity terms" and "functional terms" using special character such as "_", and replace those in the input corpus. For example, "this XYZ non-interventional study report" may be converted to "this_XYZ_non_interventional_study_report".

In some examples, the semantic relatedness analyzer 120 may generate term embeddings. For example, since the number of insights for an image may be relatively small in number (e.g., less than $10^3$ sentences), the semantic relatedness analyzer 120 may use word embeddings trained on external text corpuses. Examples of external text corpuses may include Global Vectors for Word Representation (GloVe), which may be trained on WIKIPEDIA™, TWITTER™, GIGAWORD™, etc. Other examples of external text corpuses may include Word2Vec (Neural embeddings for word representations), which may be trained on GOOGLE NEWS CORPUS™.

In some examples, since externally trained word embeddings may be used, direct embeddings may not be needed for entity and action terms. In such a case, the semantic relatedness analyzer 120 may determine (e.g., by estimating) information theoretic weighing for each term with respect to the available corpus of insights using, for example, BM25 for each word in the corpus (e.g., let $w_{bm25}$ be the weight for word w). For each word embedding:

$$v(w) \leftarrow w_{bm25} * v(w) \quad \text{Equation (8)}$$

For each multi-word term $z = w_1 \ldots w_n$, the semantic relatedness analyzer 120 may generate term embedding by summing embeddings of constituent words as follows:

$$v(z) \leftarrow \sum_{i=1}^{i=n} v(w_i) \quad \text{Equation (9)}$$

In some examples, in order to represent insights into embedding space, with $f_i$ being the $i^{th}$ insight for the image under consideration, the semantic relatedness analyzer 120 may populate a list of entity terms in $f_i$ as entity ($f_i$), and populate a list of action terms in $f_{app}$ as action($f_i$). Further, with the remaining words in $f_i$ being wd($f_i$), the semantic relatedness analyzer 120 may estimate embedding for $f_i$ as:

$$v(f_i) = [v(entity(f_i)), v(action(f_i)), v(wd(f_i))] \quad \text{Equation (10)}$$

For Equation (10):
$v(entity(f_i)) = \sum_{z \in entity(f_i)} v(z)$
$v(action(f_i)) = \sum_{z \in action(f_i)} v(z)$
$v(wd(f_i)) = \sum_{w \in wd(f_i)} v(w)$ In some examples, the semantic relatedness analyzer 120 may perform relatedness estimation as follows, for example, with respect to different insights that include insight #1, insight #2, and insight #3:

| Insight #1 | Insight #2 | Insight #3 |
|---|---|---|
| $v(bd_{App_1})$ | $v(dd_{App_2})$ | rel ($v(bd_{App_1})$, $v(bd_{App_2})$) |

The rel( ) function may be specified as follows:

For two triplets of embedding vectors $[X_{1e}, X_{1a}, X_{1w}]$, $[X_{2e}, X_{2a}, X_{2w}]$ $rel([X_{1e}, X_{1a}, X_{1w}], [X_{2e}, X_{2a}, X_{2w}])=$ $[m(X_{1e}, X_{2e}), m(X_{1a}, X_{2a}), m(X_{1w}, X_{2w})]$ $m(.,.)=$ $max\{Cosine(.,.), WordMover(.,.)\}$ Eminence Scores Referring to FIGS. 1 and 2, with respect to eminence scores, the eminence score generator 114 may generate the eminence score 116 for each insight of the plurality of insights 112.

In order to generate the eminence score 116, the eminence score generator 114 may utilize, as a component of the eminence score 116, the reliability score 118. With respect to the reliability score 118, for each insight I in Δ, the eminence score generator 114 may set reliability(I)=0. If (|Δ|>1), as disclosed herein, semantic relatedness may be determined between each pair of insights in Δ (e.g., see discussion above with respect to semantic relatedness estimation for multi-word text elements). The eminence score generator 114 may perform the following operation:

For each $(I_i, I_{j \neq i}) \in \Delta \times \Delta : w_{ij} = SemRel(I_i, I_j)$     Equation (11)

The eminence score generator 114 may generate an undirected weighted graph $G_\Delta$ (i.e., a semantic relatedness graph) with nodes representing insights, and semantic relatedness scores being used as weights associated with edges. In this regard, the eminence score generator 114 may specify node $n_I$ to represent insight I. For each node in $G_\Delta$, the eminence score generator 114 may determine the node's centrality score (by applying a node centrality technique, such as degree centrality, which is the average of all edge weights from a node, for weighted networks. The eminence score generator 114 may further specify that for each insight I∈Δ: reliability(I)=centrality($n_I$).

The eminence score generator 114 may interpret reliability scores, where individual reliability scores may indicate a degree to which an insight has information/concepts that are supported by other insights. In this regard, with respect to variability in reliability scores, a high variation across insights may indicate that the underlying object of discussion (e.g., image) is potentially complex and consists of many semantically weakly related (or less known) aspects. Further, a lower variation may imply that either the underlying object of discussion is relatively simple or is well known.

The eminence score generator 114 may utilize, as a component of the eminence score 116, the degree of atypicalness 130. With respect to the degree of atypicalness 130, for each insight I in Δ, the eminence score generator 114 may set atypicalness(I)=0. The eminence score generator 114 may specify words(I)=set of words appearing in insight I. The eminence score generator 114 may specify that words (I)=$u_{I \in \Delta}$ words(I) be the set of words across all insights (e.g., as disclosed herein with respect to term normalization of equivalent words). The semantic relatedness scores between each pair words may be determined as disclosed herein with respect to semantic relatedness estimation for words, and further as follows:

for each $(w_i, w_{j \neq i}) \in words(\Delta) \times words(\Delta)$:

$\delta_{ij} = SemRel(w_i, w_j)$     Equation(12)

For Equation (12), $\epsilon \in [0,1]$ may represent a constant for setting a lower threshold on atypicalness of words (where a default may be set to 0.5).

The eminence score generator 114 may determine the degree of atypical ness 130 (e.g., an atypical-ness score) of insight I∈Δ as follows:

atypicalness(I)=$\Sigma_{w \in I}$ {atypicalness(w)>ε}     Equation (13)

For Equation (13), atypicalness(w) = 1 − (avgConceptRel(w) ∗ Nor(iif(w)))     Equation (14)

avgConceptRel(w) = $mean_{w' \neq w \in words(\Delta)}$ {SemRel(w, w')}     Equation (15)

iif(w) = |Δ| /no of insights where w appears     Equation (16)

$$Nor(iif(w)) = \frac{iif(w) - \min_{w \in words(\Delta)} (iif(w))}{\max_{w \in words(\Delta)} (iif(w)) - \min_{w \in words(\Delta)} (iif(w))}$$     Equation (17)

The eminence score generator 114 may determine a sum of atypicalness scores of highly atypical words in an insight. Based on the analysis with respect to Equation (12)-Equation (17), the eminence score generator 114 may identify the atypical terms for each insight.

With respect to interpretation of atypicalness scores (e.g., the degree of atypicalness 130), individual atypicalness scores may indicate a degree to which an insight is odd-one-out in the insight set. As compared to other insights, the atypicalness score may capture to what extent a current insight contains concepts which are semantically weakly related with most other concepts across insights. Furthermore, insights which are represented in a unique way may include higher scores in an atypicalness scale. With respect to variability in atypicalness scores, high variation across insights may indicate that the underlying object of discussion (e.g., image) is observed to be associated with different types of aspects. Lower variation on the other hand may imply that if most of the insights have low atypicalness scores, the underlying object of discussion may be associated with relatively well known aspects. If most of the insights have high atypicalness scores, the underlying object of discussion may be associated with aspects which can be described in different ways.

The eminence score generator 114 may utilize, as a component of the eminence score 116, the conciseness score 132. With respect to the conciseness score 132, the eminence score generator 114 may estimate conciseness by measuring how complete yet brief an insight is. The eminence score generator 114 may generate a global concept graph $G_{words(\Delta)}$ for which nodes may represent concepts extracted from insights, and edge weights may represent semantic relatedness scores between concepts (as disclosed herein with respect to semantic relatedness estimation for words). The eminence score generator 114 may merge semantically equivalent nodes in $G_{words(\Delta)}$ by retaining only those edges in $G_{words(\Delta)}$ that include a weight greater than d (e.g., 0.85). Further, the eminence score generator 114 may collect all the nodes which are part of the same connected component in one group, resulting in partition of a set of concepts into very related concepts that are brought together in the same group ($X_p$ may represent the list of these groups). Further, the eminence score generator 114 may specify r as the number of total groups resulting from this process (e.g., the count of total number of semantically unique concepts across all insights).

With respect to conciseness estimation, for each insight (I∈Δ) the eminence score generator 114 may specify $i_c$ as the total number of concept occurrences in I (repetitions of concepts may be counted as many times as they occur in the insight). The eminence score generator 114 may specify $i_u$ as the total number of groups in $X_p$, which are spanned by the concepts in I (e.g., to count unique concepts present in the insight I). The eminence score generator 114 may determine the conciseness score 132 for an insight/as follows:

$$\text{conciseness}(I) = \frac{i_u}{r} * \frac{i_u}{i_c} \quad \text{Equation (18)}$$

For Equation (18), $$\frac{i_u}{r}$$

may measure relative completeness, and $$\frac{i_u}{i_c}$$

may measure degree of brevity (i.e., lack of redundancy).

With respect to interpretation of conciseness scores, individual conciseness scores may indicate the degree to which an insight can be considered relatively complete. Higher conciseness scores (e.g., closer to 1) may indicate that the insight has low semantic redundancy among its descriptions, and the insight describes most of the aspects of the underlying object of discussion as compared to other insights. Lower conciseness scores may indicate that either the insight has high redundancy in its descriptions, or the insight is missing many of the aspects of the underlying object of discussion which are described in some other insights.

With respect to variability in conciseness scores, high variation across insights may provide an indication on the nature of the insight set and the underlying sources. There may be insights with high scores that may be received from sources for which the underlying object of discussion may be associated with concepts which are relatively more familiar (e.g., included in the training set for the underlying machine learning model), and also there are insights with lower conciseness scores that may be received from those sources which do not have the means to identify, infer, and/or analyze concepts associated with the underlying object of discussion. Alternatively, lower variation across insights may imply that most of the insights are received from technically similarly effective sources with respect to the concepts which are associated with the underlying object of discussion.

The eminence score generator 114 may utilize, as a component of the eminence score 116, the naturalness score 138. With respect to the naturalness score 138, for each insight, the eminence score generator 114 may determine semantic relatedness between each pair of words appearing within the insight (e.g., as disclosed herein with respect to semantic relatedness estimation for words). The determination of semantic relatedness between each pair of words may be used to determine an intrinsic semantic relatedness graph (ISG) for each insight, where nodes may represent words, and semantic relatedness scores may represent edge weights. The eminence score generator 114 may determine expected semantic relatedness (referred to as the intrinsic semantic consistency (ISC) score) between any random pair of nodes in the intrinsic semantic graph as an average of semantic relatedness scores across a pair of nodes in the intrinsic semantic relatedness graph. The eminence score generator 114 may then determine the likelihood score of all part-of-speech (POS) trigrams within each insight. With respect to the POS trigrams, for the sentence "some trees near to a group of people camping in tents", POS tagging may result into "some/DT trees/NNS near/IN to/TO a/DT group/NN of/IN people/NNS camping/VBG in/IN tents/NNS", where the POS trigrams are {DT, NNS, IN}, {NNS, IN, TO}, {IN, TO, DT}, . . . , {VBG, IN, NNS}. The likelihood score of a trigram may represent the probability of these POS tags occurring together in a given order based upon the evidence present in a generic language model, such as WIKIPEDIA. These likelihoods may represent measures with respect to a part-of-speech trigram model generated using a generic language corpus (e.g., WIKIPEDIA). The eminence score generator 114 may determine the part-of-speech score for the insight as the mean likelihood score across all trigrams in the insight. Further, the eminence score generator 114 may determine the naturalness score as an average of intrinsic semantic consistency score and the part-of-speech score.

With respect to interpretation of the naturalness score 138, the naturalness score may indicate the degree to which an insight consists of terms which are strongly semantically related with one another (e.g., as captured by word embeddings trained on global knowledge bases). The naturalness score may also indicate how people or other intelligent agents (familiar with similar objects) are going to describe the object under observation in the same way as the current insight describes the object. A higher score may indicate that the insight includes most of the semantically strongly relevant concepts and has low redundancy among concepts contained in the insight. A lower score may indicate that the insight is describing those aspects of the underlying object of discussion, which are not so well related.

With respect to variability in the naturalness score, high variation across insights may provide an indication that the underlying object of discussion (e.g., image) consists of multiple aspects, some of which are related with one another at various levels, while others are not found to be so closely related. Alternatively, lower variation may imply that either the underlying object of discussion is associated with most of the aspects which are naturally known to be together, or most of the objects are unrelated to one another.

The eminence score generator 114 may utilize, as a component of the eminence score 116, the succinctness score (e.g., intrinsic succinctness score 134 or relative succinctness score 136). With respect to the succinctness score, succinctness may measure how much to-the-point insights are. In order to determine succinctness, the eminence score generator 114 may determine two inter-related sub measures. Intrinsic succinctness may measure the degree to which an insight contains terms with minimum necessary details. Relative succinct may measure the degree to which an insight describes concepts using terms at higher levels of abstractions when compared with other insights describing same concept.

With respect to determination of intrinsic succinctness, for each insight I, the eminence score generator 114 may determine an intrinsic succinctness score as follows. The eminence score generator 114 may collect noun type words (with part of speech tags as NN (noun, singular or mass), NNS (noun, plural), NNP (proper noun, singular), NNPS (proper noun, plural), etc. In the dependency tree of I, the eminence score generator 114 may count dependent nodes for these noun type words. The intrinsic succinctness score of insight I may be determined as follows:

$$ISS(I) = \frac{\text{number of noun type words}}{\text{number of noun type words} + \text{number of their dependents}} \quad \text{Equation (19)}$$

Equation (19) may imply that intrinsic succinctness of an insight is high if entity terms appearing in the insight contain less further information. For example, if insight-1 indicates that "A boy in red shirt and green shorts is playing with colorful ball," and insight-2 indicates that "A boy is playing with a ball," insight-2 may be determined to be more succinct than insight-1 since insight-1 has additional details (e.g., "red shirt and green shorts" and "colorful") reducing its succinctness.

With respect to determination of relative succinctness, the eminence score generator 114 may specify $c_1$, $c_2$ as the concepts appearing in the insights. The eminence score generator 114 may specify that AbsLevelDiff($c_1$, $c_2$)=r if concept $c_1$ is r levels above concept $c_2$ in the hyponymy hierarchy as per the WORDNET (a default may be set to zero). A number of concepts in the first sight $I_1$ that are at higher levels (e.g., more abstract) than concepts appearing in the second insight $I_2$ may be determined as follows:

AbsLevelDiff($I_1, I_2$)=$\Sigma_{c_1 \in I_1, c_2 \in I_2}$AbsLevelDiff($c_1, c_2$)   Equation (20)

For each insight I∈Δ, the eminence score generator 114 may determine the following:

$$RSS(I) = \frac{\Sigma_{I' \neq I \in \Delta} AbsLevelDiff(I, I')}{\text{Number of concepts in } I} \quad \text{Equation (21)}$$

The eminence score generator 114 may normalize Δ(.) scores to the [0,1] range by applying a min-max procedure. The eminence score generator 114 may combine ISS(.) and RSS(.) to determine the degree of succinctness of each insight as follows:

succinctness(I)=α*ISS(I)+(1−α)*RSS(I);α∈[0,1]   Equation (22)

For Equation (22), α may represent a numeric parameter that may be configured externally in the range of 0 and 1, with a default value being specified, for example, as 0.5.

With respect to interpretation of succinctness scores, a higher succinctness score on a succinctness scale may indicate that the insight describes concepts at relatively higher levels of abstraction as compared to other insights, while using the minimum necessary details with terms. With respect to variability in succinctness scores, a high variation across insights may indicate that there are concepts associated with the underlying object of observation, which are being described at varying levels of abstractions and that different amounts of details are being given for concepts in different insights. This may mean that underlying sources of insights have very different technical foundations (e.g., learning model, training data, etc.), which is leading to such variations. A lower variation may imply that the underlying object of observation is associated with concepts which have relatively standard ways to describe them, and that sources of insights are behaviorally equivalent as far as their capability to generate expressions to convey these concept is of concern.

For the eminence score 116, the individual scores that include the reliability score, the degree of atypicalness, the conciseness score, the naturalness score, and/or the succinctness score may be totaled. Alternatively, the individual scores that include the reliability score, the degree of atypicalness, the conciseness score, the naturalness score, and/or the succinctness score may be normalized with respect to each other, and then a total eminence score may be determined to rank a plurality of unified insights.

Figure 16:
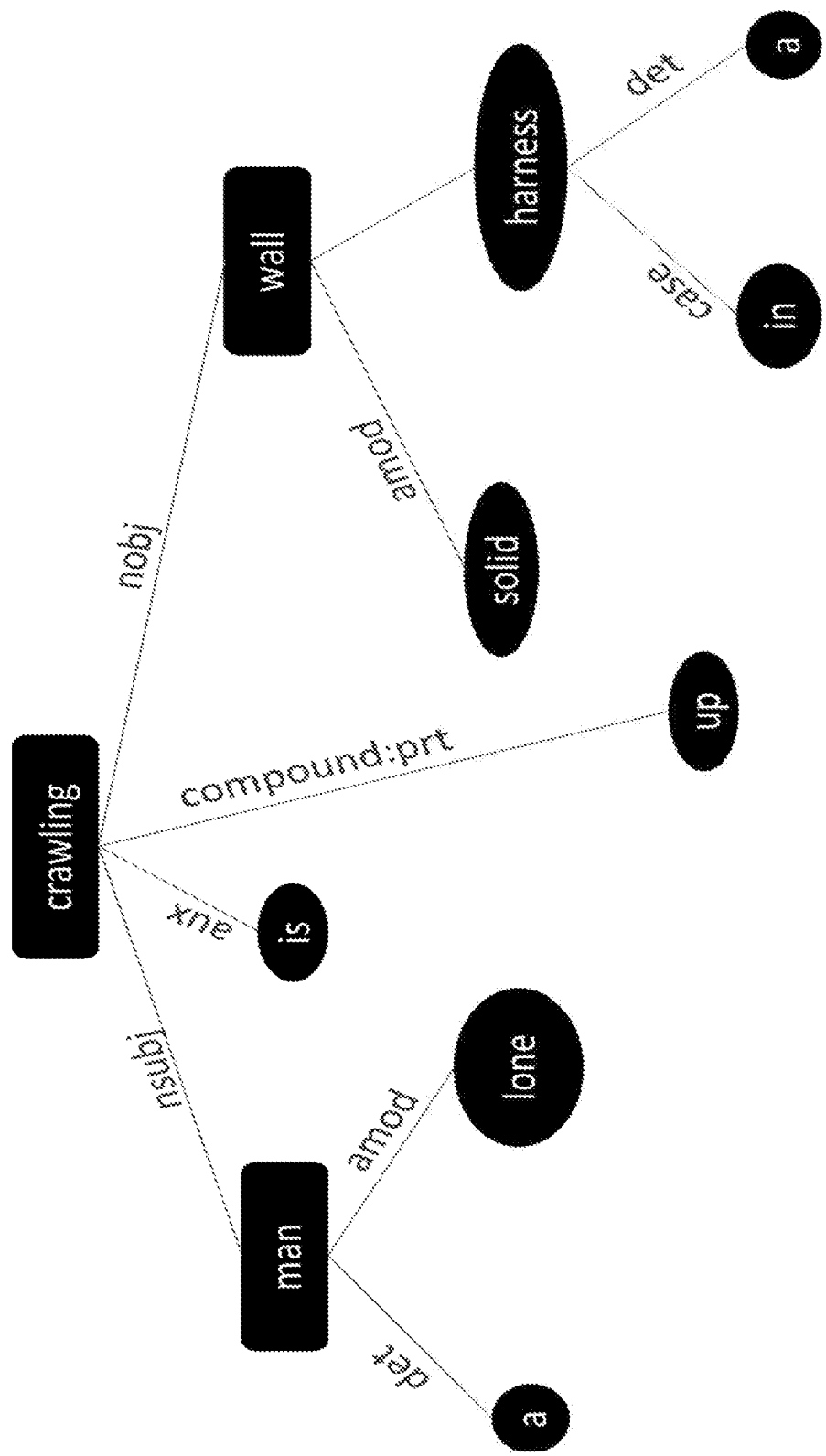
FIG. 16 illustrates a dependency tree to illustrate operation of the natural language eminence based robotic agent control apparatus of FIG. 1 in accordance with an example of the present disclosure.
Figure 17:
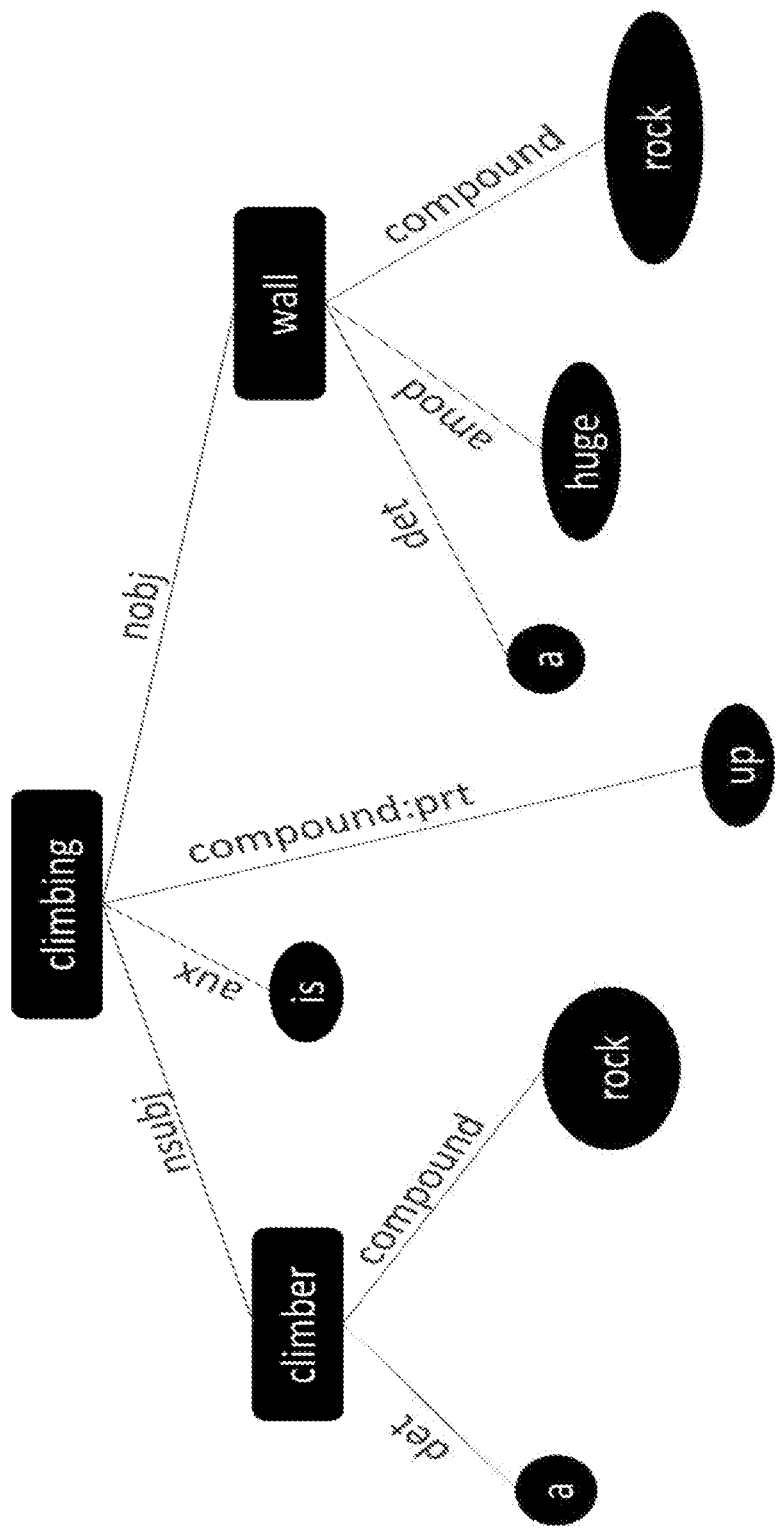
FIG. 17 illustrates a dependency tree to illustrate operation of the natural language eminence based robotic agent control apparatus of FIG. 1 in accordance with an example of the present disclosure.

FIGS. 16 and 17 illustrate dependency trees to illustrate operation of the apparatus 100 in accordance with an example of the present disclosure.

Referring to FIGS. 16 and 17, for lx="A lone man is crawling up a solid wall in a harness" and ly="A rock climber is climbing up a huge rock wall", the dependency tree for lx is shown in FIG. 16, and the dependency tree for ly is shown in FIG. 17.

Figure 3:
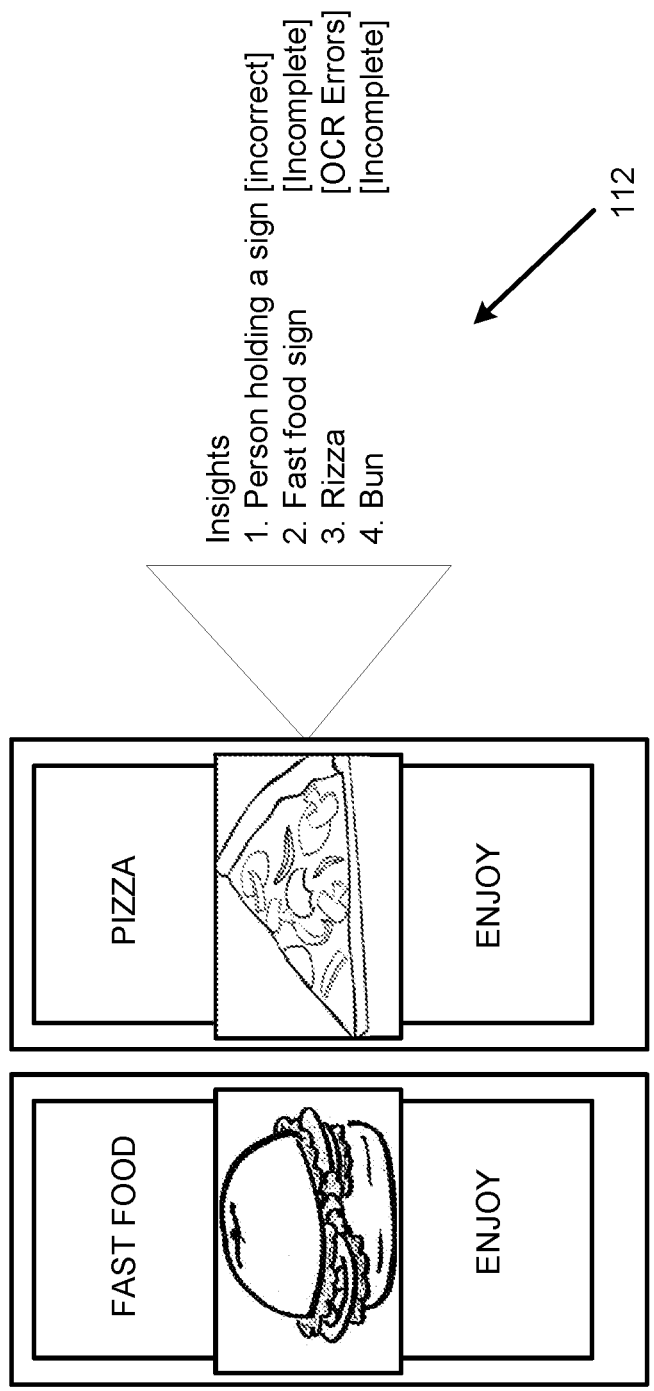
FIG. 3 illustrates an image and possible insights in accordance with an example of the present disclosure.

FIG. 3 illustrates an image and possible insights in accordance with an example of the present disclosure.

Referring to FIG. 3, the image may include a variety of objects. In this regard, a variety of insights 112 may be specified for the image 106. For example, the insights may include the following:

| | |
|---|---|
| 1. Person holding a sign | [Incorrect] |
| 2. Fast road sign | [Incomplete] |
| 3. Rizza | [OCR Errors] |
| 4. Bun | [Incomplete] |

With respect to FIG. 3, it can be seen that the various insights include errors such as incorrectness, incompleteness, OCR errors, etc.

FIG. 4 illustrates another image and possible insights to illustrate operation of the apparatus 100 in accordance with an example of the present disclosure.

Referring to FIG. 4, the image of FIG. 4 may include various insights 112, listed as "Insight1" to "Insight11".

FIG. 5 illustrates the aspect of multiple insights to multi-level insights to illustrate operation of the apparatus 100 in accordance with an example of the present disclosure.

Referring to FIG. 5, with respect to multiple insights to multi-level insights, as disclosed herein, various analysis may be made with respect to the insights. For example, an analysis may be made as to how reliable insights are, how atypical insights are, how concise (i.e., comprehensive yet brief) insights are, to what extent insights are to the point, how natural insights are, intrinsic semantic consistency, what are the central concepts embedded in the insights, and how are insights semantically related to one another.

Figure 6:
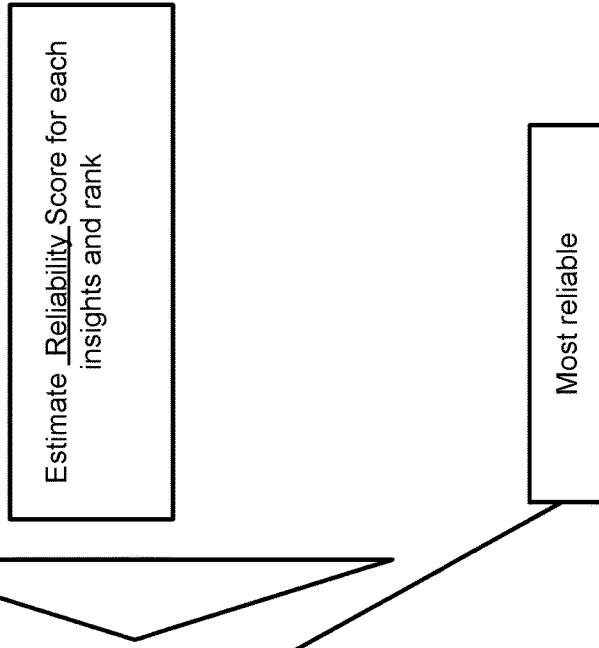
FIG. 6 illustrates determination of the most reliable insight by determination of a reliability score to illustrate operation of the natural language eminence based robotic agent control apparatus of FIG. 1 in accordance with an example of the present disclosure.

FIG. 6 illustrates determination of the most reliable insight by determination of a reliability score to illustrate operation of the apparatus 100 in accordance with an example of the present disclosure.

Referring to FIG. 6, with respect to the eminence score generator 114 that determines the reliability score 118 for each insight of the plurality of insights 112, and identifies, as results, an insight of the plurality of insights 112 with a maximum reliability score, insight 1 may be determined to be least reliable, and insight 6 may be determined to be most reliable. In this case, for the example of FIGS. 4-6, insight 1 may include "A campground with a woman", and insight 6 may include "A scenic picnic spot with lots of trees around, mountains nearby and group of people sitting around their tents." The insights 112 may then be ranked according to their reliability score.

Figure 7:
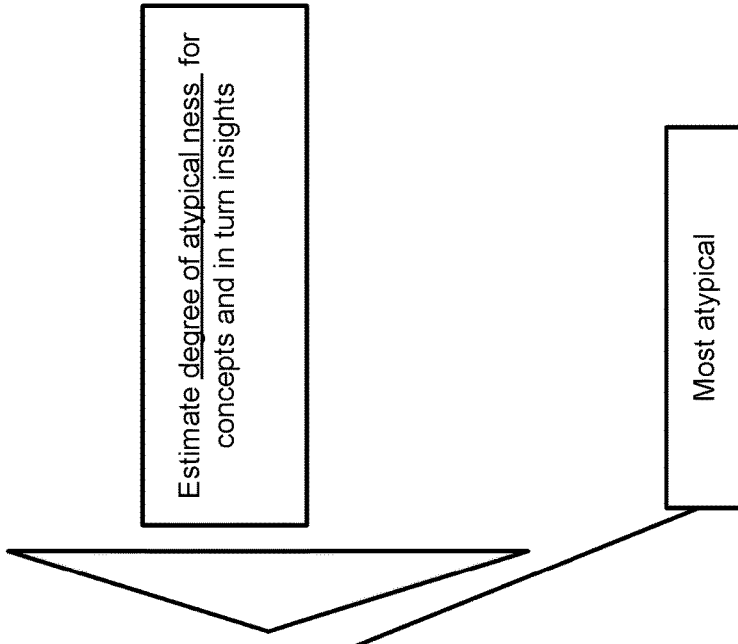
FIG. 7 illustrates determination of the most atypical insight by determination of a degree of atypicalness to illustrate operation of the natural language eminence based robotic agent control apparatus of FIG. 1 in accordance with an example of the present disclosure.

FIG. 7 illustrates determination of the most atypical insight by determination of a degree of atypicalness to illustrate operation of the apparatus 100 in accordance with an example of the present disclosure.

Referring to FIG. 7, with respect to the eminence score generator 114 that determines the degree of atypicalness 130 for each insight of the plurality of insights 112, and identifies, as results, an insight of the plurality of insights 112 with a maximum degree of atypicalness, insight 1 may be determined to be least atypical, and insight 4 may be determined to be most atypical. In this case, for the example of FIGS. 4-7, insight 1 may include "A campground with a woman", and insight 4 may include "Some trees near to a group of people camping in tents." Further, the eminence score generator 114 may determine the degree of atypicalness 130 for concepts, and thus insights.

FIG. 8 illustrates determination of the most concise insight by determination of a conciseness score to illustrate operation of the apparatus 100 in accordance with an example of the present disclosure.

Referring to FIG. 8, with respect to the eminence score generator 114 that determines the conciseness score 132 for each insight of the plurality of insights 112, and identifies, as results, an insight of the plurality of insights 112 with a maximum conciseness score, insight 1 may be determined to be least concise, and insight 10 may be determined to be most concise. In this case, for the example of FIGS. 4-8, insight 1 may include "A campground with a woman", and insight 10 may include "It's a beautiful place for an outing nice mountain view so many trees good place to chill out with family and friends."

FIG. 9 illustrates determination of an extent to which insights are to-the-point by determination of intrinsic and relative succinctness to illustrate operation of the apparatus 100 in accordance with an example of the present disclosure.

Referring to FIG. 9, with respect to the eminence score generator 114 that determines the succinctness score for each insight of the plurality of insights 112, and identifies, as results, an insight of the plurality of insights 112 with a maximum succinctness score, insight 11 may be determined to be least succinct, and insight 3 may be determined to be most succinct. In this case, for the example of FIGS. 4-9, insight 11 may include "It's an awesome place for outing, rejuvenating and having fun. The view is awesome and full of greenery. Perfect place for family and friends get together", and insight 3 may include "Picnic tables and chairs with tents on a campsite." Further, with respect to succinctness, the eminence score generator 114 may determine intrinsic and relative succinctness of entities, and in turn for insights. In this regard, intrinsic succinctness may represent brevity, and relative succinctness may represent abstraction level.

FIG. 10 illustrates determination of how natural insights are (e.g., determination of potentially inconsistent or erroneous insights) by transformation of each insight into a semantic graph and estimation of a naturalness score to illustrate operation of the apparatus 100 in accordance with an example of the present disclosure.

Referring to FIG. 10, with respect to the eminence score generator 114 that determines the naturalness score 138 for each insight of the plurality of insights 112, and identifies, as results, an insight of the plurality of insights 112 with a maximum naturalness score, insight 1 may be determined to be least consistent (e.g., least natural), and insight 3 may be determined to be most consistent (e.g., most natural). In this case, for the example of FIGS. 4-10, insight 1 may include "A campground with a woman", and insight 3 may include "Picnic tables and chairs with tents on a campsite." With respect to the naturalness score 138, the naturalness score 138 may represent a degree of consistency. In this regard, each insight may be transformed into a semantic relatedness graph, and a naturalness score may be determined for each insight to select insights with very low naturalness scores. Insight 3 may be determined to include a naturalness score 138 of 35.4%, and insight 1 may be determined to include a naturalness score 138 of 6.1%. Insight 3 and insight 1 may be determined to include relative naturalness scores of 100% and 17%. Thus, insight 3 may be determined to be a most consistent insight, and insight 1 may be determined to be a potentially inconsistent or erroneous insight. For the insights, the error threshold $Err_{threshold}$ (ISC) may be 10% for the example of FIG. 10. The naturalness score 138 may also be referred to as an intrinsic semantic consistency score, which may be determined based on a determination of semantic relatedness for each term of an insight, and then determining an average for an insight. The naturalness score for an insight may be determined by transforming the insight into an intrinsic semantic relatedness graph (e.g., as disclosed herein with respect to FIG. 11), and determining an intrinsic semantic consistency score. The likelihood score of all part-of-speech trigrams may be determined within the insight, and the mean likelihood score across all trigrams for the insight may represent a part-of-speech score for the insight. The naturalness score may be determined as an average of the intrinsic semantic consistency score and the part-of-speech score. As disclosed herein, insights may be ranked with respect to the eminence score, which may include the naturalness score.

Figure 11:
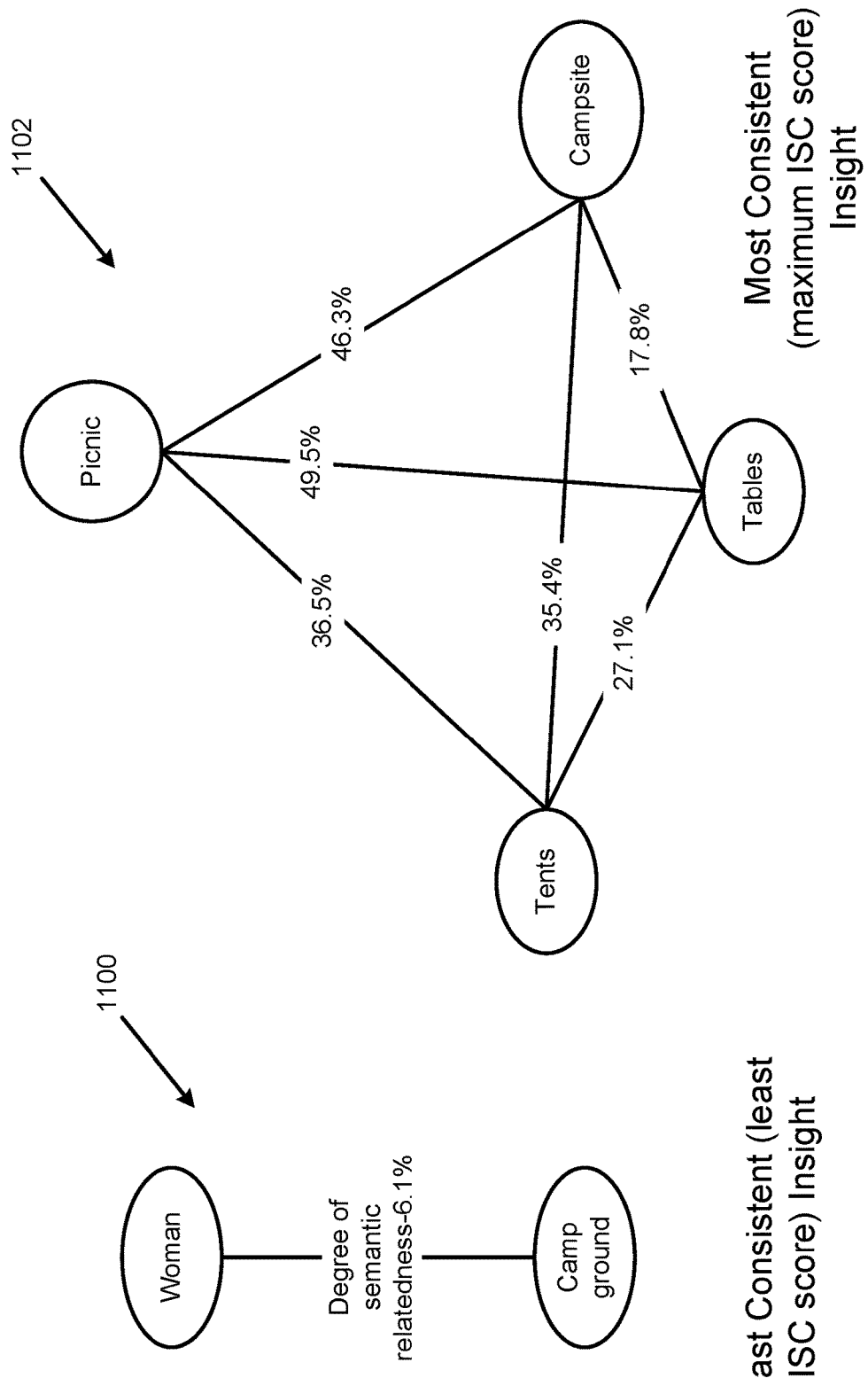
FIG. 11 illustrates intrinsic semantic relatedness graphs to illustrate operation of the natural language eminence based robotic agent control apparatus of FIG. 1 in accordance with an example of the present disclosure.

FIG. 11 illustrates intrinsic semantic relatedness graphs to illustrate operation of the apparatus 100 in accordance with an example of the present disclosure.

Referring to FIG. 11, with respect to the semantic relatedness graphs, the least consistent insight of FIG. 10 (e.g., insight 1) may include a semantic graph at 1100, and the most consistent insight of FIG. 10 (e.g., insight 3) may include a semantic graph at 1102. The semantic relatedness graphs may also include the degree of semantic relatedness.

Figure 12:
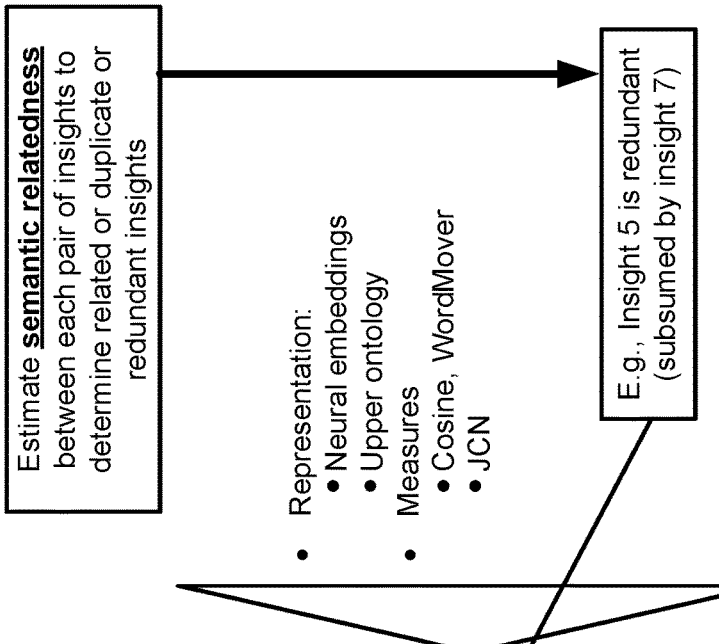
FIG. 12 illustrates estimation of semantic relatedness to identify duplicate (e.g., redundant) insights to illustrate operation of the natural language eminence based robotic agent control apparatus of FIG. 1 in accordance with an example of the present disclosure.

FIG. 12 illustrates estimation of semantic relatedness to identify duplicate (e.g., redundant) insights to illustrate operation of the apparatus 100 in accordance with an example of the present disclosure.

Referring to FIG. 12, the semantic relatedness analyzer 120 may determine semantic relatedness among insights for eliminating redundancies. In this regard, the semantic relatedness analyzer 120 may estimate semantic relatedness between each pair of insights to determine similar, or duplicate, or redundant insights. For the example of FIGS. 4-12, insight 5 may be determined to be redundant (e.g., subsumed by insight 7). For the example of FIGS. 4-12, with respect to semantic relatedness, representations may include neural embeddings, and upper ontology. Further, measures may include Cosine, WordMover, JCN, etc.

Figure 13:
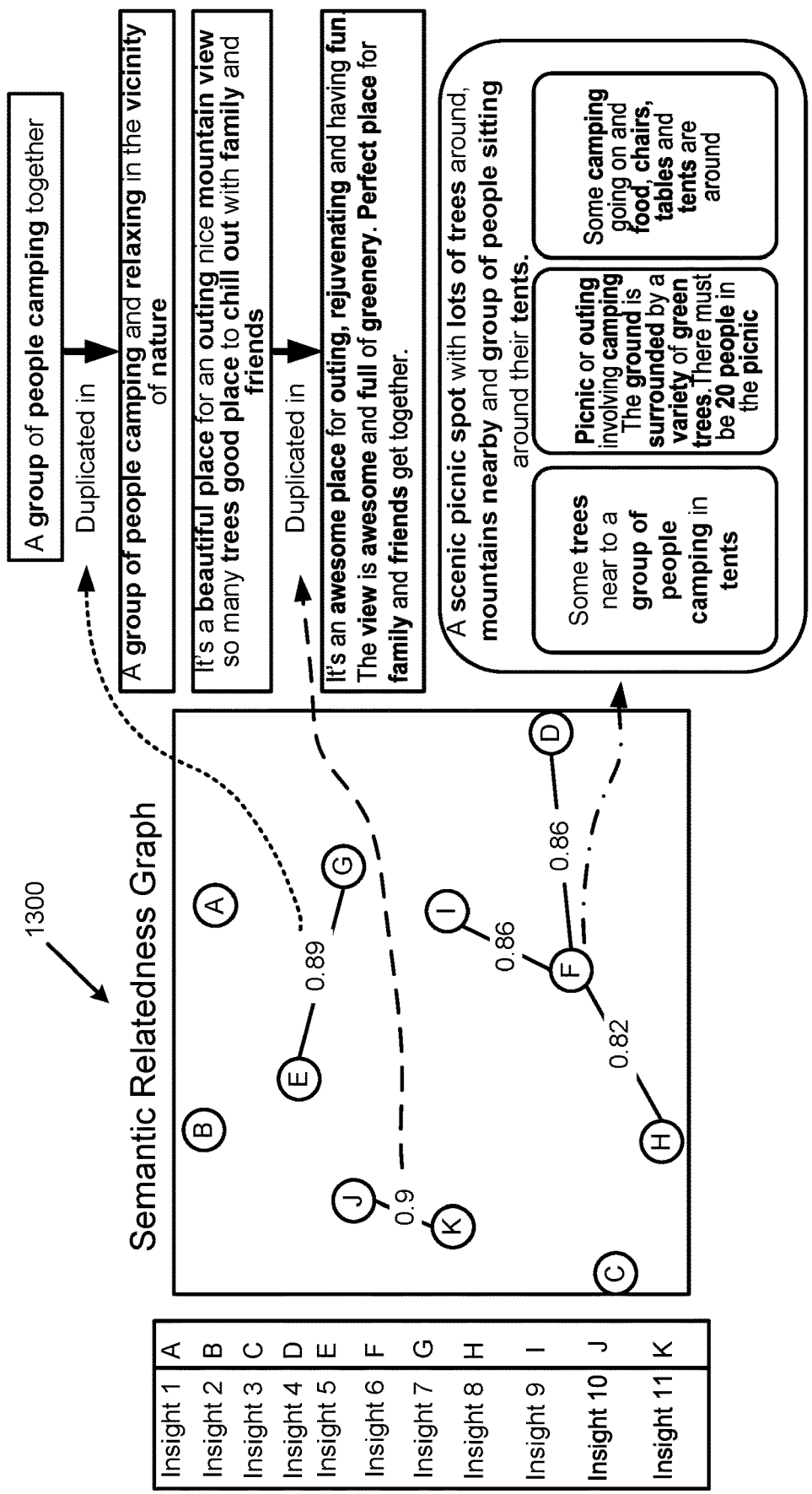
FIG. 13 illustrates further details of estimation of semantic relatedness to illustrate operation of the natural language eminence based robotic agent control apparatus of FIG. 1 in accordance with an example of the present disclosure.

FIG. 13 illustrates further details of estimation of semantic relatedness to illustrate operation of the apparatus 100 in accordance with an example of the present disclosure.

Referring to FIG. 13, a semantic relatedness graph may be generated as shown at 1300. The semantic relatedness graph may be used to estimate semantic relatedness. For example, insight 5 (A group of people camping together) may be duplicated in insight 7 (A group of people camping and relaxing in the vicinity of nature) and insight 10 (It's a beautiful place for an outing nice mountain view so many). Further, insights 7 and 10 may be duplicated in insight 11 (It's an awesome place for outing, rejuvenating and having fun. The view is awesome and full of greenery. Perfect place for family and friends get together). Similarly, insight 6 (A scenic picnic spot with lots of trees around, mountains nearby and group of people sitting around their tents) may include insight 4 (Some trees near to a group of people camping in tents), insight 9 (Picnic or outing involving camping. The ground is surrounded by a variety of green trees. There must be 20 people in the picnic), and insight 8 (Some camping going on and food, chairs, tables and tents are around).

Figure 14:
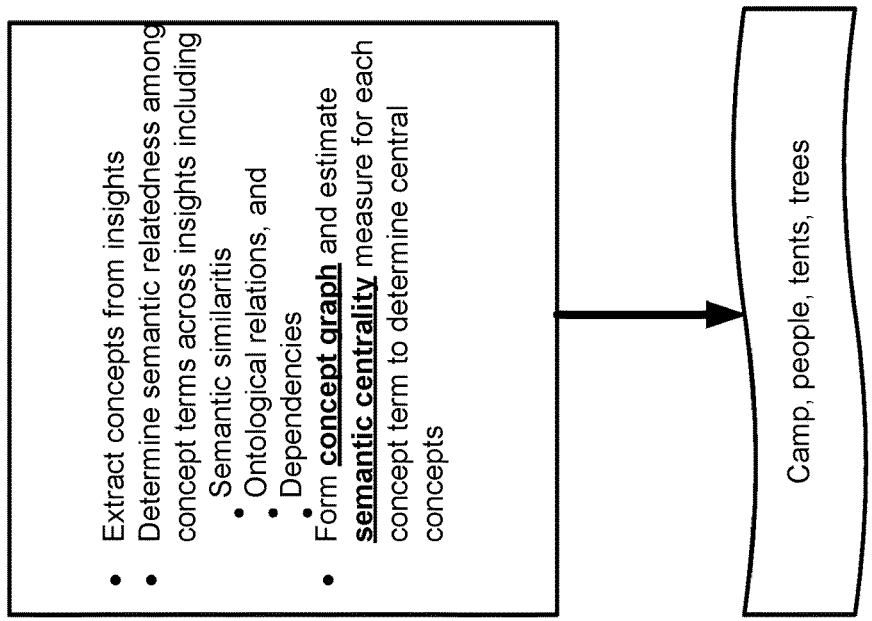
FIG. 14 illustrates determination of central concepts embedded in insights to illustrate operation of the natural language eminence based robotic agent control apparatus of FIG. 1 in accordance with an example of the present disclosure.

FIG. 14 illustrates determination of central concepts embedded in insights to illustrate operation of the apparatus 100 in accordance with an example of the present disclosure.

Referring to FIG. 14, a central concepts identifier that is executed by the at least one hardware processor (e.g., the hardware processor 1802 of FIG. 18, and/or the hardware processor 2004 of FIG. 20) may identify central concepts embedded within insights. In this regard, the central concepts identifier may extract concepts from insights. The semantic relatedness analyzer 120 may determine semantic relatedness among insights for eliminating redundancies. For example, the semantic relatedness analyzer 120 may determine different semantic relatedness among concept terms across insights including semantic relatedness, ontological relations, and dependencies. Further, the semantic relatedness analyzer 120 may generate a concept graph for each insight using semantic relatedness among concept terms. For example, the semantic relatedness analyzer 120 may generate the concept graph and determine (e.g., estimate) a semantic centrality measure for each concept term to determine central concepts. For the example of FIGS. 4-14, the central concepts identifier may identify central concepts embedded within insights as camp, people, tents, and trees.

FIG. 15 illustrates determination of semantic relatedness between insights to illustrate operation of the apparatus 100 in accordance with an example of the present disclosure.

Figure 18:
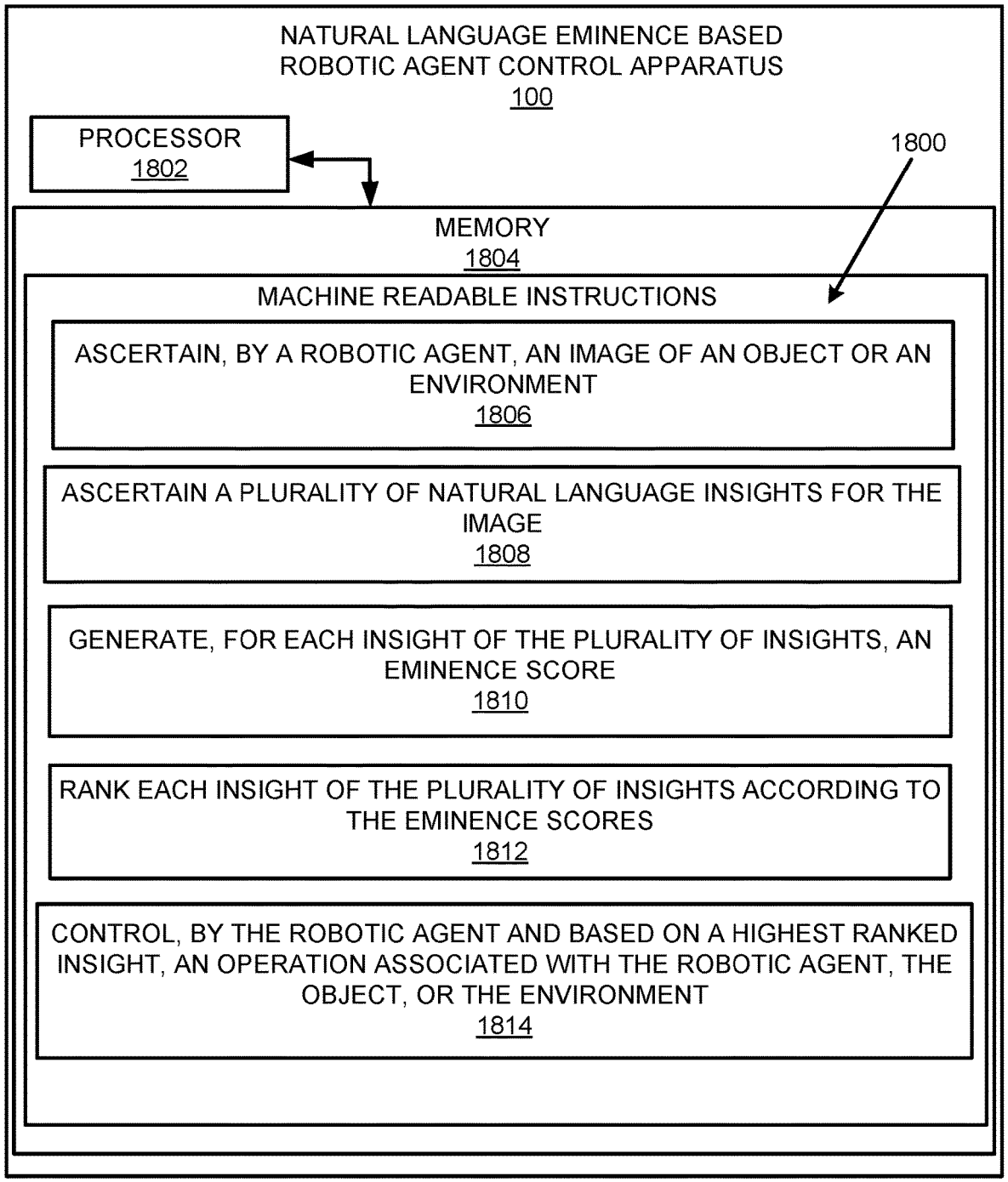
FIG. 18 illustrates an example block diagram for natural language eminence based robotic agent control in accordance with an example of the present disclosure.
Figure 20:
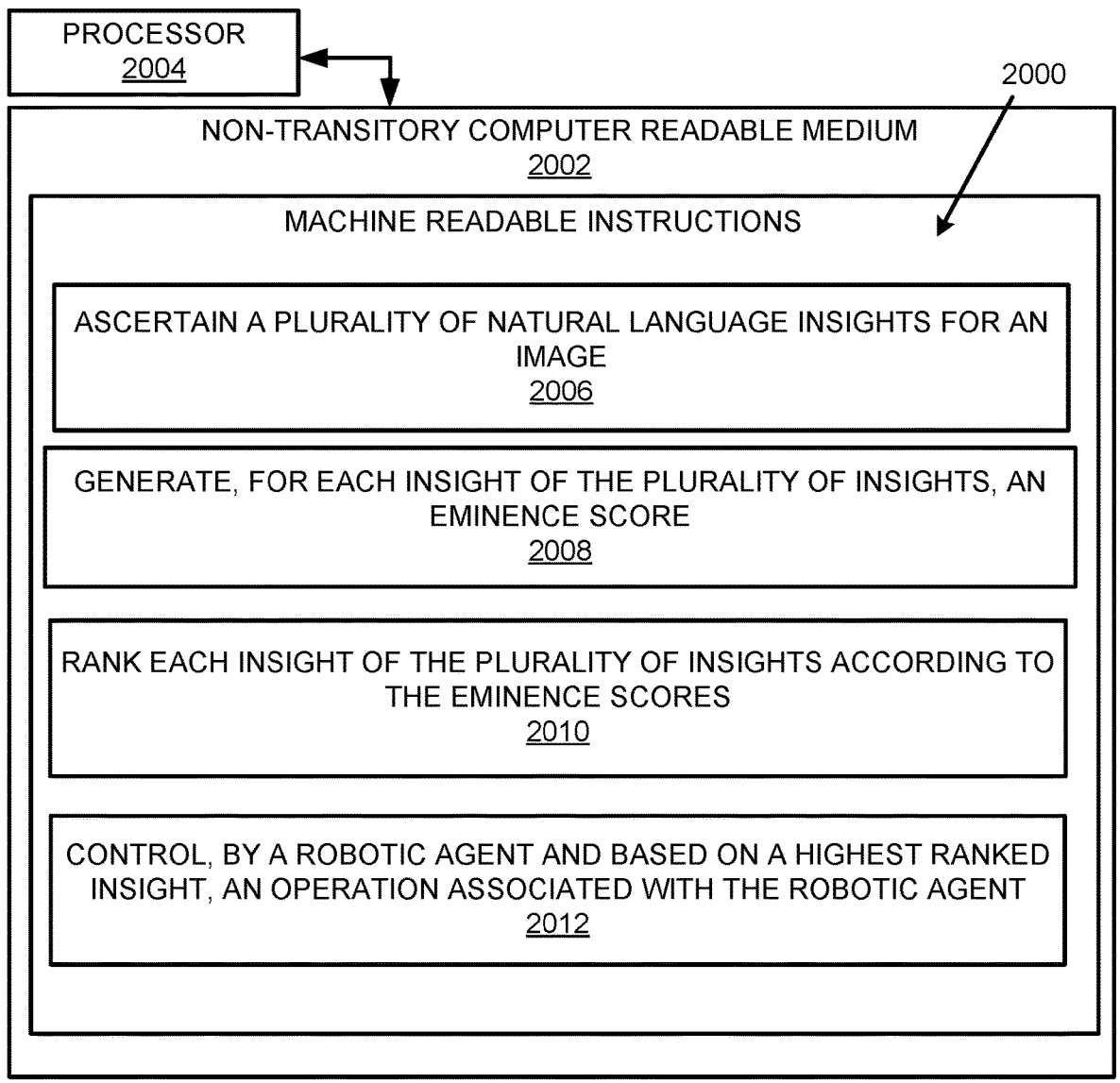
FIG. 20 illustrates a further example block diagram for natural language eminence based robotic agent control in accordance with another example of the present disclosure.

FIGS. 18-20 respectively illustrate an example block diagram 1800, a flowchart of an example method 1900, and a further example block diagram 2000 for natural language eminence based robotic agent control, according to examples. The block diagram 1800, the method 1900, and the block diagram 2000 may be implemented on the apparatus 100 described above with reference to FIG. 1 by way of example and not of limitation. The block diagram 1800, the method 1900, and the block diagram 2000 may be practiced in other apparatus. In addition to showing the block diagram 1800, FIG. 18 shows hardware of the apparatus 100 that may execute the instructions of the block diagram 1800. The hardware may include a processor 1802, and a memory 1804 storing machine readable instructions that when executed by the processor cause the processor to perform the instructions of the block diagram 1800. The memory 1804 may represent a non-transitory computer readable medium. FIG. 19 may represent an example method for natural language eminence based robotic agent control, and the steps of the method. FIG. 20 may represent a non-transitory computer readable medium 2002 having stored thereon machine readable instructions to provide natural language eminence based robotic agent control according to an example. The machine readable instructions, when executed, cause a processor 2004 to perform the instructions of the block diagram 2000 also shown in FIG. 20.

The processor 1802 of FIG. 18 and/or the processor 2004 of FIG. 20 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2002 of FIG. 20), such as hardware storage devices (e.g., RAM (random access memory), ROM (read only memory), EPROM (erasable, programmable ROM), EEPROM (electrically erasable, programmable ROM), hard drives, and flash memory). The memory 1804 may include a RAM, where the machine readable instructions and data for a processor may reside during runtime.

Referring to FIGS. 1-18, and particularly to the block diagram 1800 shown in FIG. 18, the memory 1804 may include instructions 1806 to ascertain, by a robotic agent 104, an image 106 of an object 108 or an environment 110.

The processor 1802 may fetch, decode, and execute the instructions 1808 to ascertain a plurality of natural language insights 112 for the image 106.

The processor 1802 may fetch, decode, and execute the instructions 1810 to generate, for each insight of the plurality of insights 112, an eminence score 116.

The processor 1802 may fetch, decode, and execute the instructions 1812 to rank each insight of the plurality of insights 112 according to the eminence scores.

The processor 1802 may fetch, decode, and execute the instructions 1808 to control, by the robotic agent 104 and based on a highest ranked insight 128, an operation 142 associated with the robotic agent 104, the object 108, or the environment 110.

Referring to FIGS. 1-17 and 19, and particularly FIG. 19, for the method 1900, at block 1902, the method may include ascertaining, by a robotic agent 104, an image 106 of an object 108 or an environment 110.

At block 1904, the method may include ascertaining, by at least one hardware processor, a plurality of natural language insights 112 for the image 106.

At block 1906, the method may include generating, by the at least one hardware processor, for each insight of the plurality of insights 112, an eminence score 116 by determining, for the eminence score 116, at least one of a reliability score, a degree of atypicalness, a conciseness score, a succinctness score, or a naturalness score, determining whether the eminence score 116 exceeds a specified eminence score 116 threshold, and based on a determination that the eminence score 116 exceeds the specified eminence for threshold, utilizing an insight associated with the eminence score 116 that exceeds the specified eminence score 116 threshold for selection of a highest ranked insight 128.

At block 1908, the method may include ranking, by the at least one hardware processor, each insight of the plurality of insights 112 according to the eminence scores.

At block 1910, the method may include controlling, by the at least one hardware processor, by the robotic agent 104 and based on the highest ranked insight 128, an operation 142 associated with the robotic agent 104, the object 108, or the environment 110.

Referring to FIGS. 1-17 and 20, and particularly FIG. 20, for the block diagram 2000, the non-transitory computer readable medium 2002 may include instructions 2006 to ascertain a plurality of natural language insights 112 for an image 106.

The processor 2004 may fetch, decode, and execute the instructions 2008 to generate, for each insight of the plurality of insights 112, an eminence score 116.

The processor 2004 may fetch, decode, and execute the instructions 2010 to rank each insight of the plurality of insights 112 according to the eminence scores.

The processor 2004 may fetch, decode, and execute the instructions 2012 to control, by a robotic agent 104 and based on a highest ranked insight 128, an operation 142 associated with the robotic agent 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A natural language eminence based robotic agent control apparatus comprising:
    an insight analyzer, executed by at least one hardware processor, to
        ascertain, by a robotic agent, an image of an object or an environment, and
        ascertain a plurality of natural language insights for the image;
    an eminence score generator, executed by the at least one hardware processor, to
        generate, for each insight of the plurality of insights, an eminence score, and
        rank each insight of the plurality of insights according to the eminence scores; and
    a robotic agent controller, executed by the at least one hardware processor, to
        control, by the robotic agent and based on a highest ranked insight, an operation associated with the robotic agent, the object, or the environment.

2. The apparatus according to claim 1, wherein the eminence score generator is to generate, for each insight of the plurality of insights, the eminence score by:
    determining, for the eminence score, a reliability score by
        determining, by a semantic relatedness analyzer that is executed by the at least one hardware processor, semantic relatedness between each insight of the plurality of insights,
        generating, based on the semantic relatedness between each insight of the plurality of insights, a semantic relatedness graph, wherein each node of the semantic relatedness graph represents an insight of the plurality of insights, and
        determining, for each node of the semantic relatedness graph, a degree of centrality that represents the reliability score for the corresponding insight.

3. The apparatus according to claim 2, further comprising:
    an eminence score analyzer that is executed by the at least one hardware processor to:
        analyze reliability scores for the plurality of insights to identify at least one reliability score that exceeds a reliability score threshold; and
        identify, for determination of the highest ranked insight, at least one insight associated with the identified at least one reliability score that exceeds the reliability score threshold.

4. The apparatus according to claim 1, wherein the eminence score generator is to generate, for each insight of the plurality of insights, the eminence score by:
    determining, for the eminence score, a degree of atypicalness by
        determining, for each insight of the plurality of insights, by a semantic relatedness analyzer that is executed by the at least one hardware processor, semantic relatedness between each pair of words of the insight, and
        determining, for each insight of the plurality of insights, the degree of atypicalness as a function of the semantic relatedness between each pair of words of the insight.

5. The apparatus according to claim 4, further comprising:
    an eminence score analyzer that is executed by the at least one hardware processor to:
        analyze degrees of atypicalness for the plurality of insights to identify at least one degree of atypicalness that exceeds a degree of atypicalness threshold; and
        identify, for determination of the highest ranked insight, at least one insight associated with the identified at least one degree of atypicalness that exceeds the degree of atypicalness threshold.

6. The apparatus according to claim 1, wherein the eminence score generator is to generate, for each insight of the plurality of insights, the eminence score by:
    determining, for the eminence score, a conciseness score by
        generating a concept graph that includes nodes that represent concepts extracted from the plurality of insights, and edge weights that represent semantic relatedness between the concepts,
        retaining, for the concept graph, edges that include an edge weight that exceeds a specified edge weight threshold,
        generating groups based on remaining concepts that are connected by edges, and
        determining, for a specified insight, the conciseness score as a function of a total number of concepts occurring in the specified insight and a total number of the groups that are spanned by the concepts occurring in the specified insight.

7. The apparatus according to claim 6, further comprising:
    an eminence score analyzer that is executed by the at least one hardware processor to:
        analyze conciseness scores for the plurality of insights to identify at least one conciseness score that exceeds a conciseness score threshold; and
        identify, for determination of the highest ranked insight, at least one insight associated with the identified at least one conciseness score that exceeds the conciseness score threshold.

8. The apparatus according to claim 1, wherein the eminence score generator is to generate, for each insight of the plurality of insights, the eminence score by:
    determining, for the eminence score, an intrinsic succinctness score by
        determining, for each insight of the plurality of insights, noun type words,
        generating, for each insight of the plurality of insights, a dependency tree,
        determining, for each dependency tree, a number of dependent nodes associated with the noun type words, and
        determining, for each insight of the plurality of insights, the intrinsic succinctness score as a function of a number of the noun type words and the number of dependent nodes for the associated insight.

9. The apparatus according to claim 1, wherein the eminence score generator is to generate, for each insight of the plurality of insights, the eminence score by:
    determining, for the eminence score, a relative succinctness score by
        determining, for each insight of the plurality of insights, a hierarchy of concepts included in the insight, and determining a number of concepts included in a first insight of the plurality of insight that are at a higher level than concepts included in a second insight of the plurality of insights.

10. The apparatus according to claim 9, further comprising:
an eminence score analyzer that is executed by the at least one hardware processor to:
analyze relative succinctness scores for the plurality of insights to identify at least one relative succinctness score that exceeds a relative succinctness score threshold; and
identify, for determination of the highest ranked insight, at least one insight associated with the identified at least one relative succinctness score that exceeds the relative succinctness score threshold.

11. The apparatus according to claim 1, wherein the eminence score generator is to generate, for each insight of the plurality of insights, the eminence score by:
determining, for the eminence score, a naturalness score by
determining, for each insight of the plurality of insights, a semantic relatedness between each pair of words in the insight, and
determining, for each insight of the plurality of insights, an expected semantic relatedness between node pairs in a semantic relatedness graph as an average of semantic relatedness scores across pairs of nodes in the semantic relatedness graph.

12. The apparatus according to claim 11, further comprising:
an eminence score analyzer that is executed by the at least one hardware processor to:
analyze naturalness scores for the plurality of insights to identify at least one naturalness score that is less than a naturalness score threshold; and
identify, for determination of the highest ranked insight, at least one remaining insight that is not associated with the identified at least one naturalness score that is less than the naturalness score threshold.

13. The apparatus according to claim 1, further comprising:
an eminence score analyzer that is executed by the at least one hardware processor to:
analyze, for each insight of the plurality of insights, a variability associated with the eminence score; and
determine, based on the variability associated with the eminence score, a degree of complexity of the image.

14. The apparatus according to claim 1, wherein the eminence score generator is to generate, for each insight of the plurality of insights, the eminence score by:
determining, for the eminence score, at least one of a reliability score, a degree of atypicalness, a conciseness score, a succinctness score, or a naturalness score;
determining whether the eminence score exceeds a specified eminence score threshold; and
based on a determination that the eminence score exceeds the specified eminence for threshold, utilizing an insight associated with the eminence score that exceeds the specified eminence score threshold for selection of the highest ranked insight.

15. A method for natural language eminence based robotic agent control, the method comprising:
ascertaining, by a robotic agent, an image of an object or an environment;
ascertaining, by at least one hardware processor, a plurality of natural language insights for the image;
generating, by the at least one hardware processor, for each insight of the plurality of insights, an eminence score by
determining, for the eminence score, at least one of a reliability score, a degree of atypicalness, a conciseness score, a succinctness score, or a naturalness score,
determining whether the eminence score exceeds a specified eminence score threshold, and
based on a determination that the eminence score exceeds the specified eminence for threshold, utilizing an insight associated with the eminence score that exceeds the specified eminence score threshold for selection of a highest ranked insight;
ranking, by the at least one hardware processor, each insight of the plurality of insights according to the eminence scores; and
controlling, by the at least one hardware processor, by the robotic agent and based on the highest ranked insight, an operation associated with the robotic agent, the object, or the environment.

16. The method according to claim 15, wherein generating, for each insight of the plurality of insights, the eminence score further comprises:
determining, for the eminence score, the reliability score by
determining semantic relatedness between each insight of the plurality of insights,
generating, based on the semantic relatedness between each insight of the plurality of insights, a semantic relatedness graph, wherein each node of the semantic relatedness graph represents an insight of the plurality of insights, and
determining, for each node of the semantic relatedness graph, a degree of centrality that represents the reliability score for the corresponding insight.

17. The method according to claim 15, wherein generating, for each insight of the plurality of insights, the eminence score further comprises:
determining, for the eminence score, the degree of atypicalness by
determining, for each insight of the plurality of insights, semantic relatedness between each pair of words of the insight, and
determining, for each insight of the plurality of insights, the degree of atypicalness as a function of the semantic relatedness between each pair of words of the insight.

18. A non-transitory computer readable medium having stored thereon machine readable instructions, the machine readable instructions, when executed by at least one hardware processor, cause the at least one hardware processor to:
ascertain a plurality of natural language insights for an image;
generate, for each insight of the plurality of insights, an eminence score;
rank each insight of the plurality of insights according to the eminence scores; and
control, by a robotic agent and based on a highest ranked insight, an operation associated with the robotic agent.

19. The non-transitory computer readable medium according to claim 18, wherein the machine readable instructions to generate, for each insight of the plurality of insights, the eminence score, when executed by the at least one hardware processor, further cause the at least one hardware processor to:

determine, for the eminence score, a conciseness score by
generating a concept graph that includes nodes that represent concepts extracted from the plurality of insights, and edge weights that represent semantic relatedness between the concepts,
retaining, for the concept graph, edges that include an edge weight that exceeds a specified edge weight threshold,
generating groups based on remaining concepts that are connected by edges, and
determining, for a specified insight, the conciseness score as a function of a total number of concepts occurring in the specified insight and a total number of the groups that are spanned by the concepts occurring in the specified insight.

20. The non-transitory computer readable medium according to claim 18, wherein the machine readable instructions to generate, for each insight of the plurality of insights, the eminence score, when executed by the at least one hardware processor, further cause the at least one hardware processor to:
determine, for the eminence score, a naturalness score by
determining, for each insight of the plurality of insights, a semantic relatedness between each pair of words in the insight, and
determining, for each insight of the plurality of insights, an expected semantic relatedness between node pairs in a semantic relatedness graph as an average of semantic relatedness scores across pairs of nodes in the semantic relatedness graph.

* * * * *